(12) United States Patent
Li

(10) Patent No.: US 12,085,390 B2
(45) Date of Patent: Sep. 10, 2024

(54) METHOD FOR OBTAINING MOVEMENT TRACK OF USER AND TERMINAL

(71) Applicant: Huawei Technologies Co., Ltd., Shenzhen (CN)

(72) Inventor: Qi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 663 days.

(21) Appl. No.: 17/263,787

(22) PCT Filed: Aug. 8, 2018

(86) PCT No.: PCT/CN2018/099475
§ 371 (c)(1),
(2) Date: Jan. 27, 2021

(87) PCT Pub. No.: WO2020/029146
PCT Pub. Date: Feb. 13, 2020

(65) Prior Publication Data
US 2021/0302166 A1  Sep. 30, 2021

(51) Int. Cl.
*G01C 21/16* (2006.01)
*G01C 21/36* (2006.01)
*G01C 22/00* (2006.01)

(52) U.S. Cl.
CPC ....... *G01C 21/165* (2013.01); *G01C 21/3617* (2013.01); *G01C 22/006* (2013.01)

(58) Field of Classification Search
CPC ............ G01C 21/165; G01C 21/3617; G01C 22/006; Y02D 30/70
See application file for complete search history.

(56) References Cited

U.S. PATENT DOCUMENTS 9,068,843 B1   6/2015  Sohn et al.
9,816,819 B2  11/2017  Keal et al.
(Continued)

FOREIGN PATENT DOCUMENTS

CN      1837942 A   9/2006
CN    101743478 A   6/2010
(Continued)

OTHER PUBLICATIONS

Setoguchi, H., et al., "Acceleration Noise Correction for Transfer Inference Using Accelerometers on Mobile Devices," Mobile Context Awareness, 2012, Springer London, XP055808408, 10 pages.
(Continued)

*Primary Examiner* — Sze-Hon Kong
(74) *Attorney, Agent, or Firm* — Conley Rose, P.C.

(57) ABSTRACT

A method includes obtaining gravity data of a terminal, determining that the terminal is in a first posture in a first time period determining a movement direction of a user in the first time period based on the first posture and azimuth data, determining that the terminal is in an unstable state in a second time period, determining a movement direction of the user in the second time period based on the movement direction in the first time period, determining that the terminal is in a stable state in a third time period, determining, by the terminal, a movement direction of the user in the third time period based on the movement direction in the second time period and azimuth data, and determining, by the terminal, a movement track of the user based on the movement directions of the user in all the time periods.

20 Claims, 12 Drawing Sheets

(56) References Cited

U.S. PATENT DOCUMENTS

| | | | |
|---|---|---|---|
| 10,579,037 B1* | 3/2020 | Zhang | G05B 19/406 |
| 2005/0219213 A1* | 10/2005 | Cho | G06F 3/0346 |
| | | | 345/158 |
| 2009/0143972 A1* | 6/2009 | Kitamura | A61B 5/1112 |
| | | | 701/504 |
| 2011/0022348 A1 | 1/2011 | Lee et al. | |
| 2011/0054831 A1 | 3/2011 | Fujiwara | |
| 2011/0148752 A1* | 6/2011 | Alameh | H04W 8/22 |
| | | | 345/156 |
| 2012/0120000 A1* | 5/2012 | Lucic | G06F 3/04886 |
| | | | 345/173 |
| 2012/0136573 A1* | 5/2012 | Janardhanan | G01C 22/006 |
| | | | 701/500 |
| 2012/0254809 A1* | 10/2012 | Yang | G06F 3/0346 |
| | | | 715/863 |
| 2013/0090881 A1* | 4/2013 | Janardhanan | G06F 1/163 |
| | | | 702/104 |
| 2013/0287383 A1 | 10/2013 | Haruguchi et al. | |
| 2014/0085341 A1* | 3/2014 | Shin | G06F 1/1694 |
| | | | 345/659 |
| 2014/0236479 A1* | 8/2014 | Janardhanan | G01C 21/188 |
| | | | 701/512 |
| 2014/0309752 A1 | 10/2014 | Yuzurihara et al. | |
| 2016/0018225 A1* | 1/2016 | Yang | G01C 21/16 |
| | | | 702/176 |
| 2016/0131484 A1* | 5/2016 | Shekhar | G06V 40/20 |
| | | | 702/153 |
| 2016/0134813 A1 | 5/2016 | Hu et al. | |
| 2016/0353246 A1* | 12/2016 | Elias | H04W 4/027 |
| 2017/0026800 A1* | 1/2017 | Kim | H04W 4/80 |
| 2017/0059327 A1* | 3/2017 | Miller | G01C 22/006 |
| 2017/0171821 A1* | 6/2017 | Agrawal | H04W 52/0254 |
| 2017/0234686 A1* | 8/2017 | Zhao | G01C 21/188 |
| | | | 702/150 |
| 2018/0015327 A1* | 1/2018 | Lee | G06F 3/014 |
| 2018/0054709 A1* | 2/2018 | Azami | G01C 25/005 |
| 2018/0367665 A1* | 12/2018 | Guisti | H04M 1/72463 |
| 2019/0038933 A1* | 2/2019 | Nagasaka | A63B 69/16 |
| 2019/0234740 A1* | 8/2019 | Gabbay | G01C 21/3415 |
| 2019/0323842 A1* | 10/2019 | Tateda | G01C 25/00 |
| 2019/0392648 A1* | 12/2019 | Wang | G06T 19/006 |
| 2020/0355503 A1* | 11/2020 | Chen | G01C 21/206 |
| 2021/0108923 A1* | 4/2021 | Kimishima | G01C 21/16 |
| 2021/0247189 A1* | 8/2021 | Tsujii | G01C 22/006 |

FOREIGN PATENT DOCUMENTS

| | | |
|---|---|---|
| CN | 102944240 A | 2/2013 |
| CN | 104154913 A | 11/2014 |
| CN | 104215238 A | 12/2014 |
| CN | 104266646 A | 1/2015 |
| CN | 105674984 A | 6/2016 |
| CN | 107302653 A | 10/2017 |
| CN | 107830858 A | 3/2018 |
| CN | 107990901 A | 5/2018 |
| CN | 107995410 A | 5/2018 |
| CN | 108196351 A | 6/2018 |
| EP | 3314205 A1 | 5/2018 |
| WO | 2016042296 A2 | 3/2016 |
| WO | 2016206119 A1 | 12/2016 |

OTHER PUBLICATIONS

ITU-T H.264, "Series H: Audiovisual and Multimedia Systems, Infrastructure of audiovisual services-Coding of moving video, Advanced video coding for generic audiovisual services," Apr. 2017, 812 pages.

Zhan, M., et al., "Research on Identity Authentication Technology Based on Gravity Sensor," Netinfo Security, 2017, with an English Abstract, 5 pages.

* cited by examiner

METHOD FOR OBTAINING MOVEMENT TRACK OF USER AND TERMINAL

CROSS-REFERENCE TO RELATED APPLICATIONS

This application is a U.S. National Stage of International Patent Application No. PCT/CN2018/099475 filed on Aug. 8, 2018, which is hereby incorporated by reference in its entirety.

TECHNICAL FIELD

This application relates to the field of communications technologies, and in particular, to a method for obtaining a movement track of a user and a terminal.

BACKGROUND

Currently, a location based service (Location Based Service, LBS) of a mobile phone is a value-added service provided by a mobile communications network and a satellite positioning system together. Location information (for example, longitude and latitude coordinate data) of a mobile terminal is obtained by using a group of positioning technologies, to further obtain a movement track of a user. In this solution, the mobile phone can obtain the movement track of the user only when a positioning service is always enabled in a movement process of the user. Consequently, power consumption of the mobile phone is extremely high. In addition, in a place in which a GPS signal is weak, an accurate location and the movement track of the user cannot be obtained by using this method.

In view of this, the terminal may further obtain a location and a walking route of the user by using a sensor and a pedestrian dead reckoning (Pedestrian Dead Reckoning, PDR) algorithm. Specifically, the PDR algorithm is used to combine a step size that is output by a step estimation model and a course (namely, a walking direction of the user), to obtain the relative location and the walking route of the user through reckoning. However, an existing sensor in the terminal cannot accurately determine the walking direction of the user, and consequently a walking track of the user is not accurately reckoned.

For example, in the prior art, an azimuth of a mobile phone is directly used as the walking direction of the user. In an actual scenario in which the user walks, the azimuth of the mobile phone deviates from the walking direction of the user due to a specific placement posture of the mobile phone. For example, when the head of the mobile phone faces the back of the user, and the bottom of the mobile phone faces the front of the user, the azimuth of the mobile phone is opposite to the walking direction of the user. Therefore, it is inaccurate to directly use the azimuth of the mobile phone as the walking direction of the user, the further obtained walking route of the user is also inaccurate, and user experience is relatively poor.

SUMMARY

Embodiments of this application provide a method for obtaining a movement track of a user and a terminal, to improve accuracy of obtaining a movement direction of a user by a terminal based on a sensor, and further improve accuracy of obtaining a movement track of the user by the terminal.

According to a first aspect, an embodiment of this application provides a method for obtaining a movement track of a user. The method includes:

obtaining, by a terminal, gravity data of the terminal; determining, by the terminal based on gravity data in a first time period, that the terminal is in a first posture in the first time period; determining, by the terminal, a movement direction of the user in the first time period based on the first posture and azimuth data in the first time period; if a change amplitude of gravity data of the terminal in a second time period is greater than a first threshold, determining that the terminal is in an unstable state in the second time period, where the second time period is adjacent to the first time period; determining, by the terminal, a movement direction of the user in the second time period based on the movement direction of the user in the first time period; if a change amplitude of gravity data of the terminal in a third time period is less than or equal to the first threshold, determining that the terminal is in a stable state in the third time period, where the third time period is adjacent to the second time period; determining, by the terminal, a movement direction of the user in the third time period based on the movement direction of the user in the second time period and azimuth data in the third time period; and determining, by the terminal, a first movement track of the user based on the movement directions of the user in the first time period, the second time period, and the third time period. A movement of the user may be running at a relatively low speed, for example, walking or running.

In some embodiments of this application, the terminal may obtain the gravity data of the terminal by using a gravity sensor. The gravity data may specifically include components of gravity detected by the gravity sensor on three axes of the terminal. The terminal may alternatively obtain the gravity data by using a sensor such as an acceleration sensor. This is not limited in this embodiment of this application.

The first posture is a posture determined by a posture of the terminal, for example, a posture existing when the user vertically holds the terminal and may operate the terminal, a posture existing when the user horizontally holds the terminal and the head of the terminal points to a left side or a right side of the user, a posture existing when the user places the terminal close to an ear during a call, or a posture existing when the user holds the terminal during movement and the terminal swings with an arm.

It can be learned that in this embodiment of this application, in a movement process of the user, a movement direction of the user is first determined for a time period in which the posture of the terminal can be determined, and then a movement direction of the user in a time period in which the terminal is in an unstable state and that is adjacent to the time period and a movement direction of the user in a stable state adjacent to the unstable state are determined based on the movement direction of the user. By analogy, a movement direction of the user in each time period in a target time period is determined. In addition, a movement distance of the user in each time period is obtained through calculation with reference to a PDR algorithm, to obtain a movement track of the user in the target time period. According to the method provided in this embodiment of this application, accuracy of determining the movement direction of the user in each time period is improved, to improve accuracy of obtaining the movement track of the user in the target time period, and improve user experience.

In a possible implementation, the determining, by the terminal, a movement direction of the user in the second time period based on the movement direction of the user in the first time period includes:

determining, by the terminal, that the movement direction of the user in the second time period is the same as a movement direction of the user in a fourth time period, where the fourth time period is included in the first time period, the fourth time period is adjacent to the second time period, and a change amplitude of azimuth data of the terminal in the fourth time period is less than a second threshold.

In some embodiments, the terminal may obtain an azimuth of the terminal by using a direction sensor, or obtain an azimuth of the terminal by using a rotation vector sensor, or obtain an azimuth of the terminal by using a geomagnetic sensor and an acceleration sensor. This is not limited in this embodiment of this application.

It should be noted that a time period (the second time period) in which the user changes the posture of the terminal is usually relatively short. In this case, the user has no time to change the movement direction. If the azimuth data of the terminal in the first time period is always relatively stable, that is, there is only one time period in which the azimuth data is stable in the first time period, it may be considered that the movement direction of the terminal in the second time period is the same as the movement direction of the terminal in the first time period. If the terminal has a plurality of time periods in which azimuth data is stable in the first time period, it may be considered that the movement direction of the terminal in the second time period is the same as a movement direction of the terminal in a time period (namely, the fourth time period) in which the azimuth data is stable that is in the first time period and that is adjacent to the second time period.

Therefore, in this embodiment of this application, the movement direction of the user in the second time period is determined.

In a possible implementation, the determining, by the terminal, a movement direction of the user in the third time period based on the movement direction of the user in the second time period and azimuth data in the third time period includes: determining, by the terminal, that a movement direction of the user in a fifth time period is the same as the movement direction of the user in the second time period, where the fifth time period is included in the third time period, the fifth time period is adjacent to the second time period, and a change amplitude of azimuth data of the terminal in the fifth time period is less than the second threshold.

With reference to an actual scenario, a process in which the user changes the posture of the terminal (that is, the terminal is in an unstable state) usually takes a relatively short time, and in this time period, the user usually has no time to change the movement direction. Therefore, it is considered that movement directions of the user in extremely short time periods before and after the terminal changes the posture of the terminal are the same. In other words, the movement direction of the user in the fifth time period is the same as the movement direction of the user in the fourth time period. Because the movement direction of the user in the fourth time period is determined, the movement direction of the user in the fifth time period is also determined.

Therefore, in this embodiment of this application, a movement direction of the user in a time period in which the azimuth is stable that is in the third time period and that is adjacent to the second time period is determined.

In a possible implementation, the third time period further includes at least one sixth time period, the sixth time period is not adjacent to the second time period, and a change amplitude of azimuth data of the terminal in the sixth time period is less than the second threshold; and the determining, by the terminal, a movement direction of the user in the third time period based on the movement direction of the user in the second time period and azimuth data in the third time period further includes: calculating, by the terminal, an angle difference between the movement direction of the user in the fifth time period and the azimuth data in the fifth time period; and using, by the terminal, data obtained by adding the angle difference to the azimuth data in the sixth time period as a movement direction of the terminal in the sixth time period.

It should be noted that in the third time period, the terminal is in the stable state, the posture of the terminal does not change, but if the user changes the movement direction, the azimuth of the terminal changes with the movement direction of the user. However, in the time period, a relationship between the azimuth of the terminal and the movement direction of the user is fixed. In other words, in the third time period, an angle difference between the azimuth of the terminal and the movement direction of the user is fixed.

Therefore, in this embodiment of this application, a movement direction of the user in another time period in which the azimuth is stable that is in the third time period and that is not adjacent to the second time period is determined.

In a possible implementation, the determining, by the terminal, a first movement track of the user based on the movement directions of the user in the first time period, the second time period, and the third time period includes: determining, by the terminal, the first movement track of the user based on the movement directions of the user in the first time period, the second time period, and the third time period by using a pedestrian dead reckoning PDR method.

The PDR algorithm can be used to obtain a step and a quantity of steps of the user through calculation, to obtain a movement distance of the user in each direction through calculation with reference to the determined movement direction of the user in each time period, so that a movement route of the user in a time period can be obtained.

In a possible implementation, the method further includes: if a change amplitude of gravity data of the terminal in a seventh time period is greater than the first threshold, determining that the terminal is in an unstable state in the seventh time period, where the seventh time period is adjacent to the third time period; determining, by the terminal, a movement direction of the user in the seventh time period based on the movement direction of the user in the third time period; if a change amplitude of the gravity data of the terminal in an eighth time period is less than or equal to the first threshold, determining that the terminal is in a stable state in the eighth time period, where the eighth time period is adjacent to the seventh time period; determining, by the terminal, a movement direction of the user in the eighth time period based on the movement direction of the user in the seventh time period and azimuth data in the eighth time period; and determining, by the terminal, a second movement track of the user based on the movement directions of the user in the seventh time period and the eighth time period.

It should be noted that for an unstable time period (for example, a segment from 81 to 85, denoted as the seventh time period) and a stable time period (a segment from 85 to 113, denoted as the eighth time period) that are not adjacent to the first time period, the seventh time period is adjacent to the third time period. Because the movement direction in the third time period is determined, the movement direction of the user in the time period may be determined based on the movement direction in the third time period by using a similar method, so that the movement direction of the user in the eighth time period is determined based on the movement directions in the seventh time period and the third time period.

In a possible implementation, the determining, by the terminal based on gravity data in a first time period, that the terminal is in a first posture in the first time period includes: if in the first time period, both Y-axis gravity data and Z-axis gravity data of the terminal are greater than 0, each of change amplitudes of the Y-axis gravity data and the Z-axis gravity data of the terminal is less than a third threshold, and an absolute value of the Z-axis gravity data of the terminal is less than a fourth threshold, determining that the terminal is in the first posture in the first time period, where the first posture is a posture of the terminal that exists when the user vertically holds the terminal and the head of the terminal points to the front of the user; and when the terminal is in the first posture, an azimuth of the terminal is the same as a movement direction of the user.

If each of the change amplitudes of the Y-axis gravity data and the Z-axis gravity data of the terminal is less than the third threshold, it indicates that the Y-axis gravity data and the Z-axis gravity data of the terminal are stable and do not fluctuate greatly. If the absolute value of the Z-axis gravity data of the terminal is less than the fourth threshold, it indicates that the Z-axis gravity data of the terminal is close to 0.

In a possible implementation, the determining, by the terminal based on gravity data in a first time period, that the terminal is in a first posture in the first time period includes: if in the first time period. X-axis gravity data of the terminal is less than 0, Z-axis gravity data of the terminal is greater than 0, an absolute value of Y-axis gravity data of the terminal is less than a fourth threshold, and each of change amplitudes of the X-axis gravity data, the Y-axis gravity data, and the Z-axis gravity data of the terminal is less than a third threshold, determining that the terminal is in the first posture in the first time period, where the first posture is a posture of the terminal that exists when the user horizontally holds the terminal and the head of the terminal points to a right side of the user; and when the terminal is in the first posture, data obtained by subtracting 90 degrees from azimuth data of the terminal is a movement direction of the user.

If each of the change amplitudes of the X-axis gravity data, the Y-axis gravity data, and the Z-axis gravity data of the terminal is less than the third threshold, it indicates that the gravity data of the terminal on three axes is stable and does not fluctuate greatly. If the absolute value of the Y-axis gravity data of the terminal is less than the fourth threshold, it indicates that the Z-axis gravity data of the terminal is close to 0.

In a possible implementation, the determining, by the terminal based on gravity data in a first time period, that the terminal is in a first posture in the first time period includes: if in the first time period, both X-axis gravity data and Z-axis gravity data of the terminal are greater than 0, each of change amplitudes of the X-axis gravity data and the Z-axis gravity data of the terminal is less than a third threshold, and an absolute value of Y-axis gravity data of the terminal is less than a fourth threshold, determining that the terminal is in the first posture in the first time period, where the first posture is a posture of the terminal that exists when the user horizontally holds the terminal and the head of the terminal points to a left side of the user, and when the terminal is in the first posture, data obtained by adding 90 degrees to azimuth data of the terminal is a movement direction of the user.

If both the X-axis gravity data and the Z-axis gravity data of the terminal are greater than 0, and each of the change amplitudes of the X-axis gravity data and the Z-axis gravity data of the terminal is less than the third threshold, it indicates that the X-axis gravity data and the Z-axis gravity data of the terminal are stable and do not fluctuate greatly. If the absolute value of the Y-axis gravity data is less than the fourth threshold, it indicates that the Y-axis gravity data is close to 0.

In a possible implementation, the determining, by the terminal based on gravity data in a first time period, that the terminal is in a first posture in the first time period includes: determining, by the terminal based on the gravity data in the first time period, data of a distance sensor, and a call status of the terminal, that the terminal is in the first posture in the first time period, where the first posture is a posture existing when the user holds the terminal close to an ear during a call; and when the terminal is in the first posture, data obtained by adding 180 degrees to or subtracting 180 degrees from azimuth data of the terminal is a movement direction of the user.

In a possible implementation, the determining, by the terminal based on gravity data in a first time period, that the terminal is in a first posture in the first time period includes: determining, by the terminal based on the gravity data in the first time period, and linear acceleration data and rotation vector data of the terminal, that the terminal is in the first posture in the first time period, where the first posture is a posture existing when the user holds the terminal during movement and the terminal swings with an arm; and the determining, by the terminal, a movement direction of the user in the first time period based on azimuth data in the first time period is specifically: if the terminal determines that the head of the terminal points to the front of the user, using, by the terminal, the azimuth data of the terminal in the first time period to represent the movement direction of the user in the first time period; or if the terminal determines that the head of the terminal points to the back of the user, using, by the terminal, data obtained by adding 180 degrees to or subtracting 180 degrees from the azimuth data in the first time period to represent the movement direction of the user in the first time period.

According to a second aspect, a terminal is provided, and includes a processor, a memory, and a touchscreen. The memory and the touchscreen are coupled to the processor, the memory is configured to store computer program code, the computer program code includes a computer instruction, and when the computer instruction is executed by the processor, the terminal is enabled to perform the method according to any one of the first aspect and the possible implementations of the first aspect.

According to a third aspect, an apparatus is provided, and the apparatus is included in a terminal. The apparatus has a function of implementing behavior of the terminal in the method according to any one of the first aspect and the possible implementations of the first aspect. The function may be implemented by hardware, or may be implemented by hardware executing corresponding software. The hardware or the software includes one or more modules or units corresponding to the foregoing function, for example, an obtaining module or unit and a processing module or unit.

According to a fourth aspect, a computer storage medium is provided, and includes a computer instruction. When the computer instruction is run on a terminal, the terminal is enabled to perform the method according to any one of the first aspect and the possible implementations of the first aspect.

According to a fifth aspect, a computer program product is provided. When the computer program product is run on a computer, the computer is enabled to perform the method according to any one of the first aspect and the possible implementations of the first aspect.

DESCRIPTION OF EMBODIMENTS

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

To better understand the method provided in the embodiments of this application, some terms used in the embodiments of this application are first described.

Figure 3:
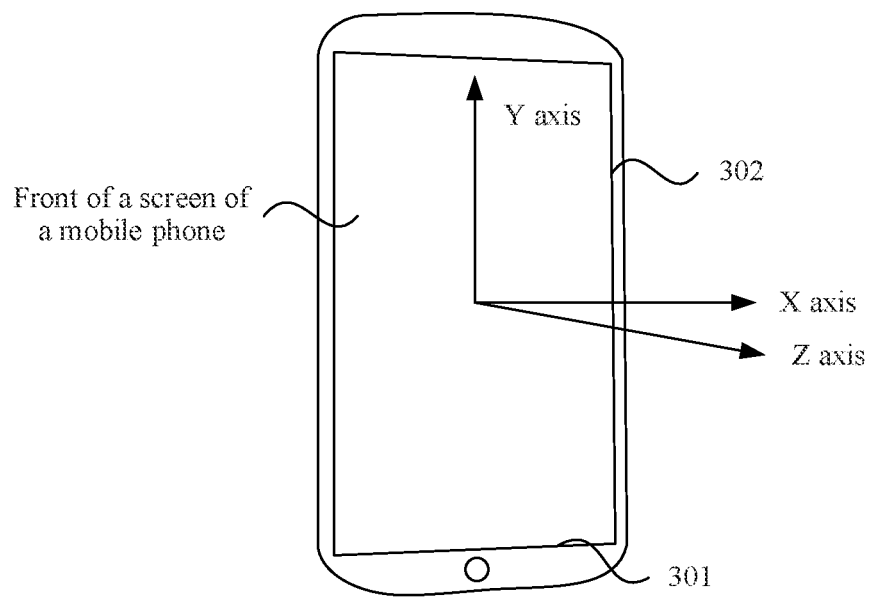
FIG. 3 is a schematic diagram of a natural coordinate system of a terminal according to an embodiment of this application.

Natural coordinate system of a mobile phone: As shown in FIG. 3, in the natural coordinate system of the mobile phone, a firmware center of the mobile phone is used as an origin. The X axis is parallel to a bottom frame (as shown in 301 in FIG. 3) of a screen of the mobile phone, and a direction from a left side of the front of the screen of the mobile phone to a right side is a positive direction of the X axis. The Y axis is parallel to a side frame (as shown in 302 in FIG. 3) of the screen of the mobile phone, and a direction from the bottom of the screen of the mobile phone to the head of the screen is a positive direction of the Y axis. The Z axis is perpendicular to a plane on which the screen of the mobile phone is located, and a direction from the back of the screen of the mobile phone to the front of the screen of the mobile phone is a positive direction of the Z axis. It should be noted that the foregoing coordinate axis directions and coordinates are constant relative to the mobile phone, and do not change with a posture in which the mobile phone is placed.

Figure 11:
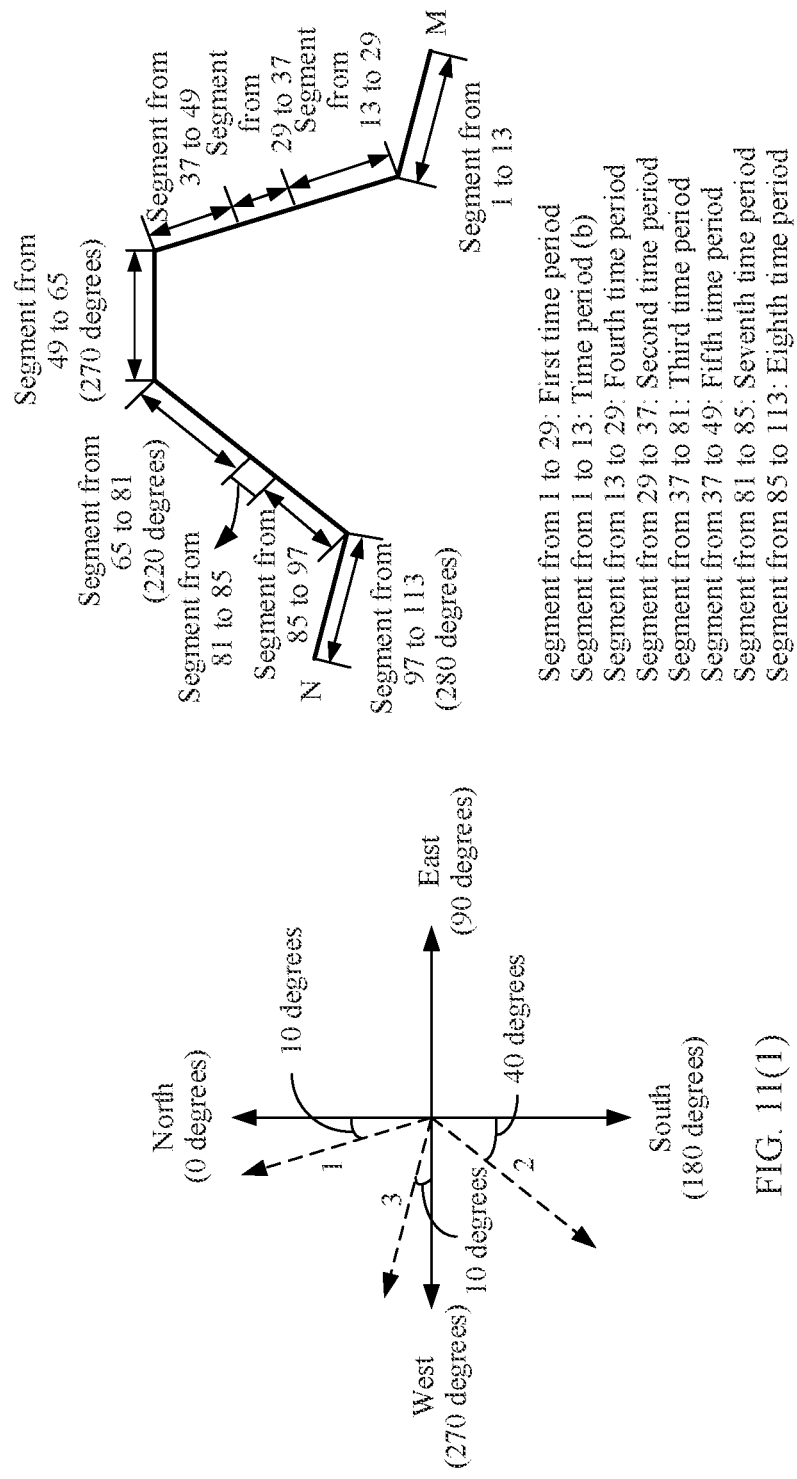
FIG. 11(1) and FIG. 11(2) are a schematic diagram of an obtained movement track of a user according to an embodiment of this application.

Movement direction: In this embodiment of this application, an angle value may be used to represent the movement direction of a user. As shown in FIG. 11(1), a due north direction corresponds to 0 degrees, and an angle increases when rotation is performed clockwise. A due east direction corresponds to 90 degrees. A due south direction corresponds to 180 degrees, and a due west direction corresponds to 270 degrees.

Figure 4:
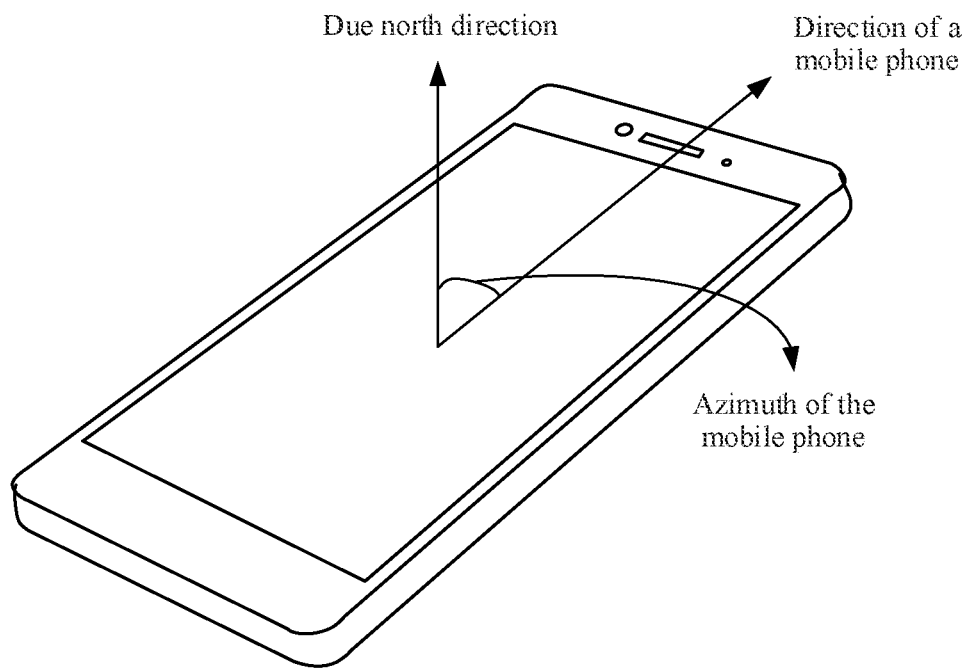
FIG. 4 is a schematic diagram of an azimuth of a terminal according to an embodiment of this application.

Azimuth of the mobile phone: As shown in FIG. 4, the azimuth of the mobile phone in this embodiment of this application reflects a direction of the mobile phone on a horizontal plane. It may be understood that when the mobile phone is horizontally placed, the azimuth of the mobile phone is an included angle between the due north direction and the positive direction of the Y axis in the natural coordinate system of the mobile phone. When the mobile phone is not horizontally placed, the azimuth of the mobile phone is an included angle between the due north direction and a component of the Y axis on the horizontal plane in the natural coordinate system of the mobile phone. It should be noted that when the mobile phone is placed perpendicular to the horizontal plane, the azimuth of the mobile phone is an included angle between a direction that the back of the mobile phone faces and the due north direction, which may be understood as an included angle between a reverse direction of the Z axis and the due north direction. The azimuth is a two-dimensional concept and ranges from 0 to 360.0 degrees correspond to the due north direction, 90 degrees correspond to the due east direction, 180 degrees correspond to the due south direction. and 270 degrees correspond to the due west direction.

Pedestrian dead reckoning (Pedestrian Dead Reckoning, PDR): The PDR is used to measure and collect statistics about a quantity of walking steps, a walking step size, and walking directions of a pedestrian, to obtain information such as a walking track and a location of the pedestrian through reckoning. Specifically, the PDR algorithm is used to combine a step size that is output by a step estimation model and a course (namely, a walking direction of the user), to obtain a relative location of the pedestrian through reckoning. Currently, a sensor in a terminal cannot accurately determine the walking direction of the user, and consequently a walking track of the user is not accurately reckoned. The PDR algorithm may also be applicable to another low-speed movement, for example, running.

Therefore, according to the method for obtaining a movement track of a user provided in this embodiment of this application, the sensor in the terminal may correct the azimuth of the terminal, determine a movement direction of the user, and then obtain a movement distance of the user in each movement direction through calculation with reference to the PDR algorithm, to obtain a movement track (namely, a movement track) of the user. In this embodiment of this application, the azimuth of the mobile phone is corrected, to help improve accuracy of obtaining the movement track of the user, and improve user experience.

For example, the terminal in this application may be a mobile phone, a tablet computer, a personal computer (Personal Computer, PC), a personal digital assistant (personal digital assistant, PDA), a smartwatch, a netbook, a wearable electronic device, an augmented reality (Augmented Reality, AR) technology device, a virtual reality (Virtual Reality, VR) device, a vehicle-mounted device, a smart car, or the like. A specific form of the terminal is not specially limited in this application.

Figure 1:
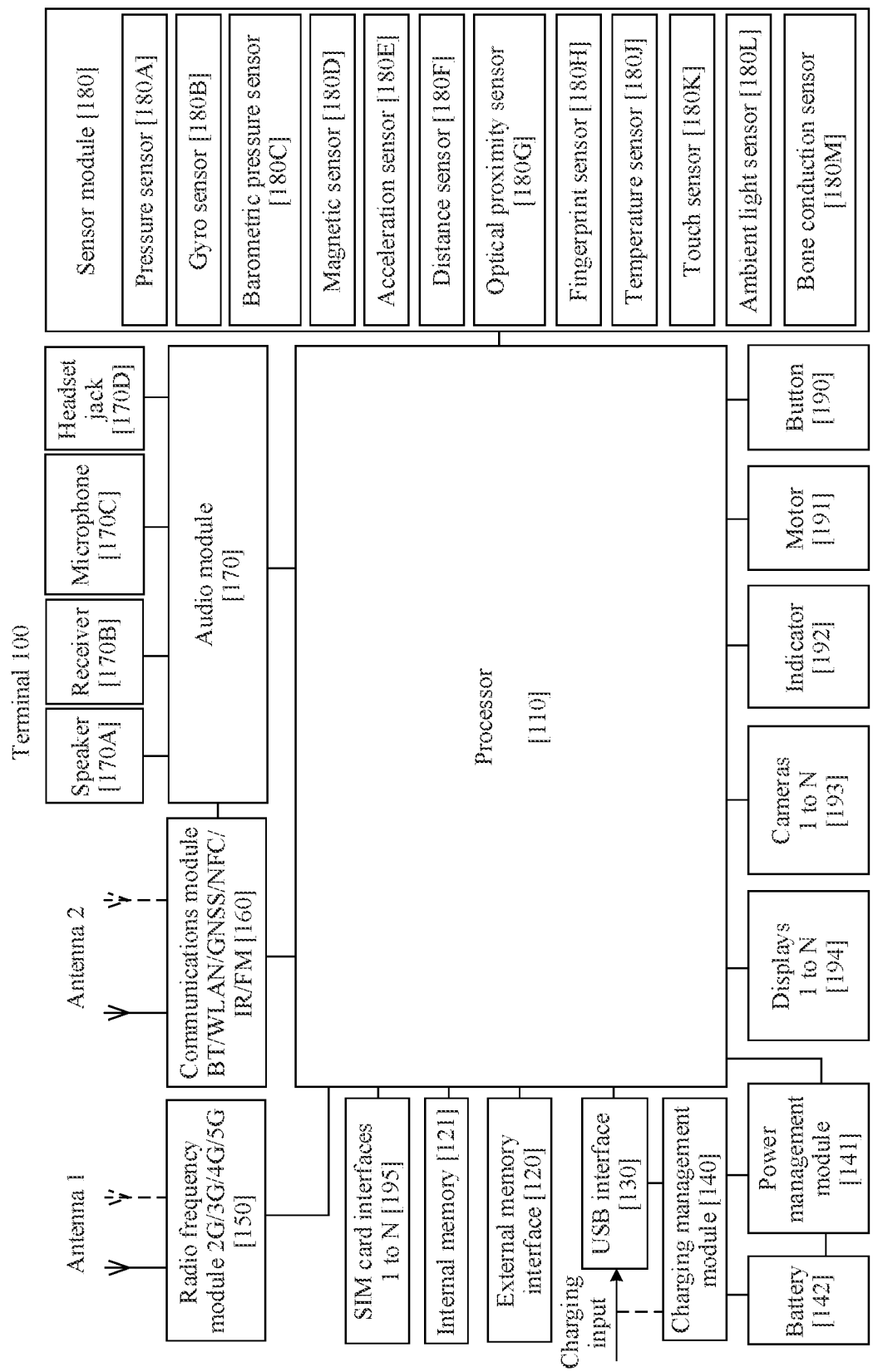
FIG. 1 is a schematic structural diagram 1 of a terminal according to an embodiment of this application.

FIG. 1 is a structural block diagram of a terminal 100 according to an embodiment of this application.

The terminal 100 may include a processor 110, an external memory interface 120, an internal memory 121, a USB interface 130, a charging management module 140, a power management module 141, a battery 142, an antenna 1, an antenna 2, a radio frequency module 150, a communications module 160, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

A structure shown in this embodiment of this application does not constitute a limitation on the terminal 100. The terminal 100 may include more or fewer components than those shown in the figure, or combine some components, or split some components, or have different component arrangements. The components in the figure may be implemented by using hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (Neural-network Processing Unit. NPU). Different processing units may be independent devices, or may be integrated into one or more processors.

The controller may be a decision maker that directs each component of the terminal 100 to coordinate work according to an instruction. The controller is a nerve center and a command center of the terminal 100. The controller generates an operation control signal based on an instruction operation code and a time sequence signal, to complete control of instruction fetching and instruction execution.

The memory may be further disposed in the processor 110, and is configured to store an instruction and data. In some embodiments, the memory in the processor is a cache, and may store an instruction or data that is just used or cyclically used by the processor. If the processor needs to use the instruction or the data again, the processor may directly invoke the instruction or the data from the memory, to avoid repeated access and reduce a waiting time of the processor. Therefore, system efficiency is improved.

In some embodiments, the processor 110 may include an interface. The interface may include an inter-integrated circuit (inter-integrated circuit. I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

An interface connection relationship between the modules shown in this embodiment of this application is merely an example for description, and does not constitute a limitation on the structure of the terminal 100. The terminal 100 may use different interface connection manners or a combination of a plurality of interface connection manners in this embodiment of this application.

The charging management module 140 is configured to receive charging input from a charger. The charger may be a wireless charger or a wired charger. In some embodiments of wired charging, the charging management module may receive charging input from the wired charger through the USB interface. In some embodiments of wireless charging, the charging management module may receive wireless charging input by using a wireless charging coil of the terminal 100. When charging the battery, the charging management module may further supply power to a terminal device by using the power management module 141.

The power management module 141 is configured to be connected to the battery 142, the charging management module 140, and the processor 110. The power management module receives input from the battery and/or the charging management module, and supplies power to the processor, the internal memory, an external memory, the display, the camera, the communications module, and the like. The power management module may be further configured to monitor parameters such as a battery capacity, a battery cycle count, and a battery health status (an electric leakage or impedance). In some embodiments, the power management module 141 may alternatively be disposed in the processor 110. In some embodiments, the power management module 141 and the charging management module may alternatively be disposed in a same device.

A wireless communication function of the terminal 100 may be implemented by using an antenna module 1, an antenna module 2, the radio frequency module 150, the communications module 160, a modem, the baseband processor, and the like.

The antenna 1 and the antenna 2 are configured to: transmit and receive an electromagnetic wave signal. Each antenna in the terminal 100 may be configured to cover one or more communication bands. Different antennas may be further multiplexed, to improve antenna utilization. For example, a cellular network antenna may be multiplexed as a wireless local area network diversity antenna. In some embodiments, an antenna may be used in combination with a tuning switch.

The radio frequency module 150 may provide a communications processor module that is applied to the terminal 100 and that includes a wireless communication solution such as 2G/3G/4G/5G. The radio frequency module 150 may include at least one filter, a switch, a power amplifier, a low noise amplifier (Low Noise Amplifier, LNA), and the like. The radio frequency module may receive an electromagnetic wave by using the antenna 1, perform processing such as filtering or amplification on the received electromagnetic wave, and transfer the electromagnetic wave to the modem for demodulation. The radio frequency module may further amplify a signal modulated by the modem, and convert the signal into an electromagnetic wave for radiation by using the antenna 1. In some embodiments, at least some function modules in the radio frequency module 150 may be disposed in the processor 150. In some embodiments, at least some function modules in the radio frequency module 150 may be disposed in a same device as at least some modules in the processor 110.

The communications module 160 may provide a communications processor module that is applied to the terminal 100 and that includes a wireless communication solution such as a wireless local area network (wireless local area networks, WLAN), Bluetooth (bluetooth, BT), a global navigation satellite system (global navigation satellite system, GNSS), frequency modulation (frequency modulation, FM), a near field communication (near field communication, NFC) technology, or an infrared (infrared, IR) technology. The communications module 160 may be one or more devices integrating at least one communications processor module. The communications module receives an electromagnetic wave by using the antenna 2, performs frequency modulation and filtering processing on an electromagnetic wave signal, and sends a processed signal to the processor. The communications module 160 may alternatively receive a to-be-sent signal from the processor, perform frequency modulation and amplification on the signal, and convert the signal into an electromagnetic wave for radiation by using the antenna 2.

In some embodiments, the antenna 1 and the radio frequency module in the terminal 100 are coupled, and the antenna 2 and the communications module in the terminal 100 are coupled, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The terminal 100 implements a display function by using the GPU, the display 194, the application processor, and the like. The GPU is a microprocessor for image processing, and is connected to the display and the application processor. The GPU is configured to perform mathematical and geometric calculation, and is configured to render an image. The processor 110 may include one or more GPUs that execute a program instruction to generate or change display information.

The display 194 is configured to display an image, a video, and the like. The display includes a display panel. The display panel may use an LCD (liquid crystal display, liquid crystal display), an OLED (organic light-emitting diode, organic light-emitting diode), an active-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the terminal 100 may include one display or N displays, where N is a positive integer greater than 1.

The terminal 100 can implement a photographing function by using the ISP, the camera 193, the video codec, the GPU, the display, the application processor, and the like.

The external memory interface 120 may be configured to be connected to an external storage card, for example, a micro SD card, to extend a storage capability of the terminal 100. The external storage card communicates with the processor through the external memory interface, to implement a data storage function, for example, store files such as music and a video in the external storage card.

The internal memory 121 may be configured to store computer executable program code, where the executable program code includes an instruction. The processor 110 performs various function applications of the terminal 100 and data processing by running the instruction stored in the internal memory 121. The memory 121 may include a program storage area and a data storage area. The program storage area may store an operating system, an application program required by at least one function (for example, a sound playing function or an image playing function), and the like. The data storage area may store data (for example, audio data or a phone book) created during use of the terminal 100, and the like. In addition, the memory 121 may include a high-speed random access memory, and may further include a nonvolatile memory, for example, at least one magnetic disk storage device, a flash storage device, another volatile solid-state storage device, a universal flash storage (universal flash storage, UFS), or the like.

The terminal 100 can implement an audio function by using the audio module 170, the speaker 170A, the receiver 170B, the microphone 170C, the headset jack 170D, the application processor, and the like, for example, music playing or recording.

The audio module is configured to convert digital audio information into an analog audio signal for output, and is also configured to convert analog audio input into a digital audio signal. The audio module may be further configured to: encode and decode an audio signal. In some embodiments, the audio module may be disposed in the processor 110, or some function modules in the audio module are disposed in the processor 110.

The speaker 170A, also referred to as a "horn", is configured to convert an audio electrical signal into a sound signal. The terminal 100 may play music by using the speaker, or receive a hands-free call.

The receiver 170B, also referred to as an "earpiece", is configured to convert an audio electrical signal into a sound signal. When a call is answered or voice information is received by using the terminal 100, the receiver may be placed close to a human ear to receive a voice.

The microphone 170C, also referred to as a "mike" or a "microphone", is configured to convert a sound signal into an electrical signal. When making a call or sending voice information, a user may make a sound by moving a human mouth close to the microphone to input a sound signal to the microphone. At least one microphone may be disposed in the terminal 100. In some embodiments, two microphones may be disposed in the terminal 100, to collect a sound signal and further implement a noise reduction function. In some embodiments, three, four, or more microphones may alternatively be disposed in the terminal 100, to collect a sound signal, reduce noise, and further recognize a sound source, implement a directional recording function, and the like.

The headset jack 170D is configured to be connected to a wired headset. The headset jack may be a USB interface, or may be a 3.5 mm open mobile terminal platform (open mobile terminal platform, OMTP) standard interface or a cellular telecommunications industry association of the USA (cellular telecommunications industry association of the USA, CTIA) standard interface.

The gyro sensor 180B may be configured to determine a movement posture of the terminal 100. In some embodiments, angular velocities of the terminal 100 around three axes (namely, x, y, and z axes) may be determined by using the gyro sensor. The gyro sensor may be used for image stabilization during photographing. For example, when a shutter is pressed, the gyro sensor detects an angle at which the terminal 100 jitters, obtains, through calculation based on the angle, a distance for which a lens module needs to compensate, and allows a lens to cancel the jitter of the terminal 100 through reverse motion, to implement image stabilization. The gyro sensor may also be used in navigation and somatic game scenarios.

The barometric pressure sensor 180C is configured to measure barometric pressure. In some embodiments, the terminal 100 calculates an altitude by using a value of the barometric pressure measured by the barometric pressure sensor, to assist positioning and navigation.

The magnetic sensor 180D includes a Hall sensor. The terminal 100 may detect opening and closing of a flip leather case by using the magnetic sensor. In some embodiments, when the terminal 100 is a clamshell phone, the terminal 100 may detect opening and closing of a flip cover based on the magnetic sensor. Further, a feature such as automatic unlocking of the flip cover is set based on a detected opening or closing state of the leather case or a detected opening or closing state of the flip cover.

The acceleration sensor 180E may detect values of accelerations in all directions (usually three axes) of the terminal 100. When the terminal 100 is still, a value and a direction of gravity may be detected. The acceleration sensor 180E may be further configured to identify a posture of the terminal, and is applied to applications such as a pedometer and screen switching between landscape mode and portrait mode.

In this embodiment of this application, the terminal 100 may alternatively identify a posture of the terminal by using any one or more of a gravity sensor, a linear acceleration sensor, and a rotation vector sensor. For example, the terminal 100 identifies, by using the gravity sensor, a posture existing when the user vertically holds the terminal 100 and the terminal is in portrait mode. For another example, the terminal 100 identifies, by using the gravity sensor, the distance sensor, or the optical proximity sensor, and a call status of the terminal, a posture of holding the terminal 100 close to an ear during a call. For still another example, the terminal identifies, by using the gravity sensor, the linear acceleration sensor, and the rotation vector sensor, a posture existing when the user holds the terminal, and the terminal swings with an arm back and forth, or the like. In this embodiment of this application, the terminal may further determine, by using the gravity sensor, whether a placement posture of the terminal 100 changes.

It should be noted that the gravity sensor, the linear acceleration sensor, and the rotation vector sensor may be hardware sensors or software sensors. For example, in some embodiments, the software sensors obtain data from the acceleration sensor 180E and the magnetic sensor 180D. In some other embodiments, the software sensors may alternatively obtain data from the gyro sensor 180B. This is not specifically limited in this embodiment of this application.

The distance sensor 180F is configured to measure a distance. The terminal 100 may measure a distance through infrared light or a laser. In some embodiments, in a photographing scenario, the terminal 100 may measure a distance by using the distance sensor to implement quick focusing The optical proximity sensor 180G may include, for example, a light emitting diode (LED) and an optical detector, for example, a photodiode. The light emitting diode may be an infrared light emitting diode, and the light emitting diode emits infrared light. The photodiode detects infrared reflected light from a nearby object. When sufficient reflected light is detected, it may be determined that there is an object near the terminal 100. When insufficient reflected light is detected, it may be determined that there is no object near the terminal 100. The terminal 100 may detect, by using the optical proximity sensor, that the user holds the terminal 100 close to an ear during a call, so as to automatically turn off a screen to save power and avoid an accidental touch. The optical proximity sensor may also be used in a leather case mode or a pocket mode to automatically unlock or lock a screen.

In some embodiments of this application, the terminal 100 may detect, by using the distance sensor 180F or the optical proximity sensor 180G, whether the mobile phone holds the terminal 100 close to an ear during a call.

In this embodiment of this application, the terminal 100 may further include a direction sensor. The direction sensor may be a hardware sensor or a software sensor In some embodiments, if the direction sensor is the software sensor, the direction sensor may obtain data from the acceleration sensor 180E and the magnetic sensor 180D.

It should be noted that the terminal may obtain an azimuth of the terminal by using the direction sensor, or obtain an azimuth of the terminal by using the rotation vector sensor, or obtain an azimuth of the terminal by using a geomagnetic sensor and the acceleration sensor. This is not limited in this embodiment of this application.

The button 190 includes a power button, a volume button, and the like. The button may be a mechanical button or a touch button. The terminal 100 receives button input, and generates button signal input related to a user setting and function control of the terminal 100.

The motor 191 may generate a vibration prompt. The motor may be used for an incoming call vibration prompt, or may be used for a touch vibration feedback. For example, touch operations performed on different applications (for example, a photographing application and an audio playing application) may correspond to different vibration feedback effects. Touch operations performed on different areas of the display may also correspond to different vibration feedback effects. Different application scenarios (for example, a time reminder, information receiving, an alarm clock, a game, and the like) may also correspond to different vibration feedback effects. A touch vibration feedback effect may be further customized.

The indicator 192 may be an indicator light that may be configured to indicate a charging status and a battery power change, or may be configured to indicate a message, a missed call, a notification, and the like.

The SIM card interface 195 is configured to be connected to a subscriber identity module (subscriber identity module, SIM). A SIM card may be inserted into the SIM card interface or removed from the SIM card interface, to implement contact with or separation from the terminal 100. The terminal 100 may support one SIM card interface or N SIM card interfaces, where N is a positive integer greater than 1. The SIM card interface may support a nano-SIM card, a micro-SIM card, a SIM card, and the like. A plurality of cards may be simultaneously inserted into a same SIM card interface. The plurality of cards may be of a same type or different types. The SIM card interface may also be compatible with different types of SIM cards, and the SIM card interface may also be compatible with the external storage card. The terminal 100 interacts with a network by using the SIM card, to implement functions such as calling and data communication. In some embodiments, the terminal 100 uses an eSIM, namely, an embedded SIM card. The eSIM card may be embedded in the terminal 100 and cannot be separated from the terminal 100.

A software system of the terminal 100 may use a layered architecture, an event-driven architecture, a microkernel architecture, a microservice architecture, or a cloud architecture. In this embodiment of this application, an Android system with the layered architecture is used as an example to describe a software structure of the terminal 100.

Figure 2:
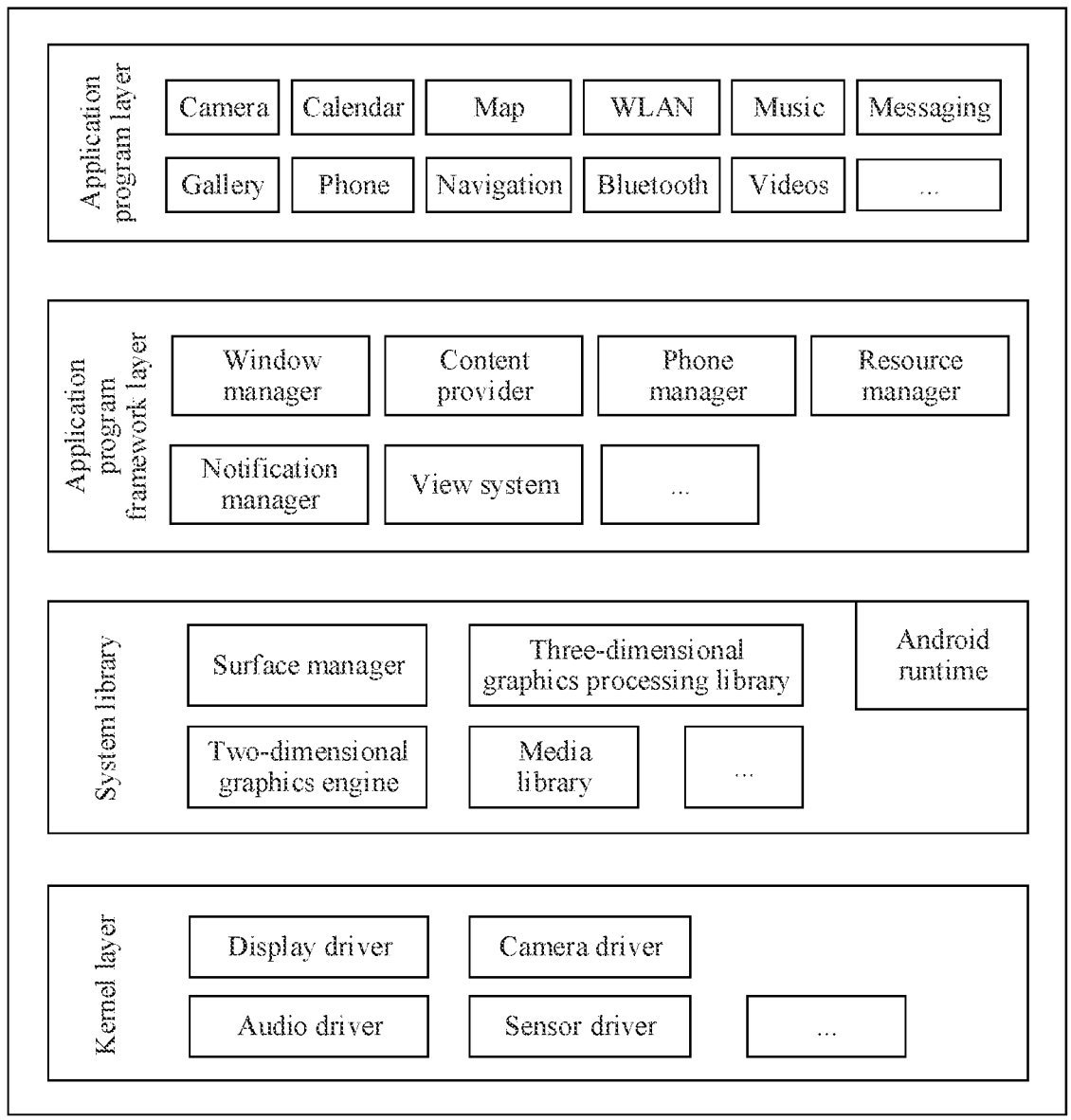
FIG. 2 is a schematic structural diagram 2 of a terminal according to an embodiment of this application.

FIG. 2 is a structural block diagram of software of a terminal 100 according to an embodiment of this application.

In the layered architecture, the software is divided into several layers, and each layer has a clear role and task. The layers communicate with each other through an interface. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 2, the application package may include applications such as Camera, Gallery, Calendar, Phone, Map, Navigation, WLAN, Bluetooth, Music, Videos, and Messaging.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and make the data accessible to an application. The data may include a video, an image, an audio, calls that are made and answered, a browsing history and a bookmark, a phone book, and the like.

The view system includes visual controls such as a control for displaying a character and a control for displaying a picture, and the view system may be configured to construct an application. A display interface may include one or more views. For example, a display interface including a messaging notification icon may include a view for displaying a character and a view for displaying a picture.

The phone manager is configured to provide a communication function of the terminal 100, for example, management of a call status (including answering or declining).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is played, the terminal vibrates, or the indicator light blinks.

The Android runtime includes a kernel library and a virtual machine, and the Android runtime is responsible for scheduling and management of the Android system.

The kernel library includes two parts: a function that needs to be invoked by a java language and a kernel library of Android.

The application layer and the application framework layer run on the virtual machine. The virtual machine executes a java file at the application layer and the application framework layer as a binary file. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library OpenGL ES, and a 2D graphics engine SGL.

The surface manager is configured to: manage a display subsystem, and provide fusion of 2D and 3D layers for a plurality of applications.

The media library supports playback and recording of a plurality of commonly used audio and video formats, static image files, and the like. The media library may support a plurality of audio and video encoding formats, for example, MPEG 4, H.264, MP3, AAC, AMR, JPG, PNG, and the like.

OpenGL ES is configured to implement three-dimensional graphics drawing, image rendering, composition, layer processing, and the like.

SGL is a drawing engine for 2D drawing.

The kernel layer is a layer between hardware and software. The kernel layer includes at least a display driver, a camera driver, an audio driver, and a sensor driver.

The following describes working procedures of software and hardware of the terminal 100 by using an example with reference to a scenario in which the user walks carrying the terminal. It should be noted that in a scenario in which the user carries the terminal to perform another low-speed movement, a same method may be used to obtain a movement track.

In the embodiments of this application, each sensor in the terminal sends detected data of the sensor to the kernel layer by using a corresponding hardware interrupt, and the kernel layer processes the data of the sensor into an original input event and stores the original input event. The application framework layer obtains the original input event from the kernel layer, processes the data of each sensor (for example, determines states (for example, a posture determining state, an unstable state, and a stable state) of the terminal based on the gravity sensor, determines a time period corresponding to each state to further determine a walking direction, a walking distance, and the like of the user in each time period, and then obtains, through calculation, a route along which the user walks carrying the terminal in a time period), and may invoke a display device by using a display driver at the kernel layer to display a processing result (the walking route of the user).

It should be first noted that in this embodiment of this application, the user walks carrying the terminal. With reference to a scenario in which the user uses the terminal in a walking process, the terminal determines a movement direction of the terminal by analyzing and processing the data detected by the sensor in the terminal. Then, the movement direction of the terminal is used to represent the movement direction of the user, to further obtain the walking route of the user. A movement track of the terminal is equivalent to the walking route of the user.

In general, in the solutions provided in the embodiments of this application, a first time period in which a posture of the terminal can be determined is obtained based on gravity data detected by the terminal. Because the posture of the terminal in the first time period is determined, a relationship between the azimuth of the terminal and the walking direction of the user can be obtained. For example, the azimuth is the same as or opposite to the walking direction, or a difference between the azimuth and the walking direction is ±90 degrees. Then, a second time period adjacent to the first time period is determined, and the terminal is in an unstable state in the second time period. With reference to an actual scenario, the terminal is usually in an unstable state in a time period in which the user changes the posture of the terminal, and the time period is usually relatively short. Therefore, it may be considered that a walking direction of the user in the second time period does not change. To be specific, the walking direction of the user in the second time period is the same as a walking direction of the user in the first time period (the azimuth is stable in the first time period), or is the same as a walking direction of the user in a time period that is in the first time period and that is adjacent to the second time period (there are a plurality of time periods in which azimuths are stable in the first time period). Then, a third time period adjacent to the second time period is determined, and the terminal is in a stable state in the third time period. Similarly, when the terminal is just in a stable state in the third time period, a walking direction of the user in a time period that is in the third period and that is adjacent to the second time period is the same as the walking direction in the second time period. It should be noted that when the terminal is in the stable state, the posture of the terminal does not change, and therefore the relationship between the azimuth of the terminal and the walking direction of the user is fixed. In other words, an angle difference between the azimuth and the walking direction is fixed. Therefore, when the terminal is just in the stable state in the third time period, the angle difference between the azimuth of the terminal and the walking direction of the user is obtained through calculation. An azimuth of the terminal in another time period in the third time period is corrected by using the angle difference, to determine a walking direction of the user in the another time period in the third time period.

It should be further noted that in the embodiments of this application, whether the terminal is displaced and whether a displacement speed falls within a walking range of the user may be determined by using a PDR algorithm. In other words, whether the user walks may be determined by using the PDR algorithm. Optionally, the terminal may alternatively determine, by using another method, for example, by obtaining an acceleration of the terminal by using the acceleration sensor, whether the terminal is displaced and whether a displacement speed falls within a walking range of the user. This is not limited in the embodiments of this application. After it is determined that the user walks, the following steps in the embodiment of this application may be performed to determine a walking direction of the user in each time period, to further obtain a walking route of the user.

Figure 5:
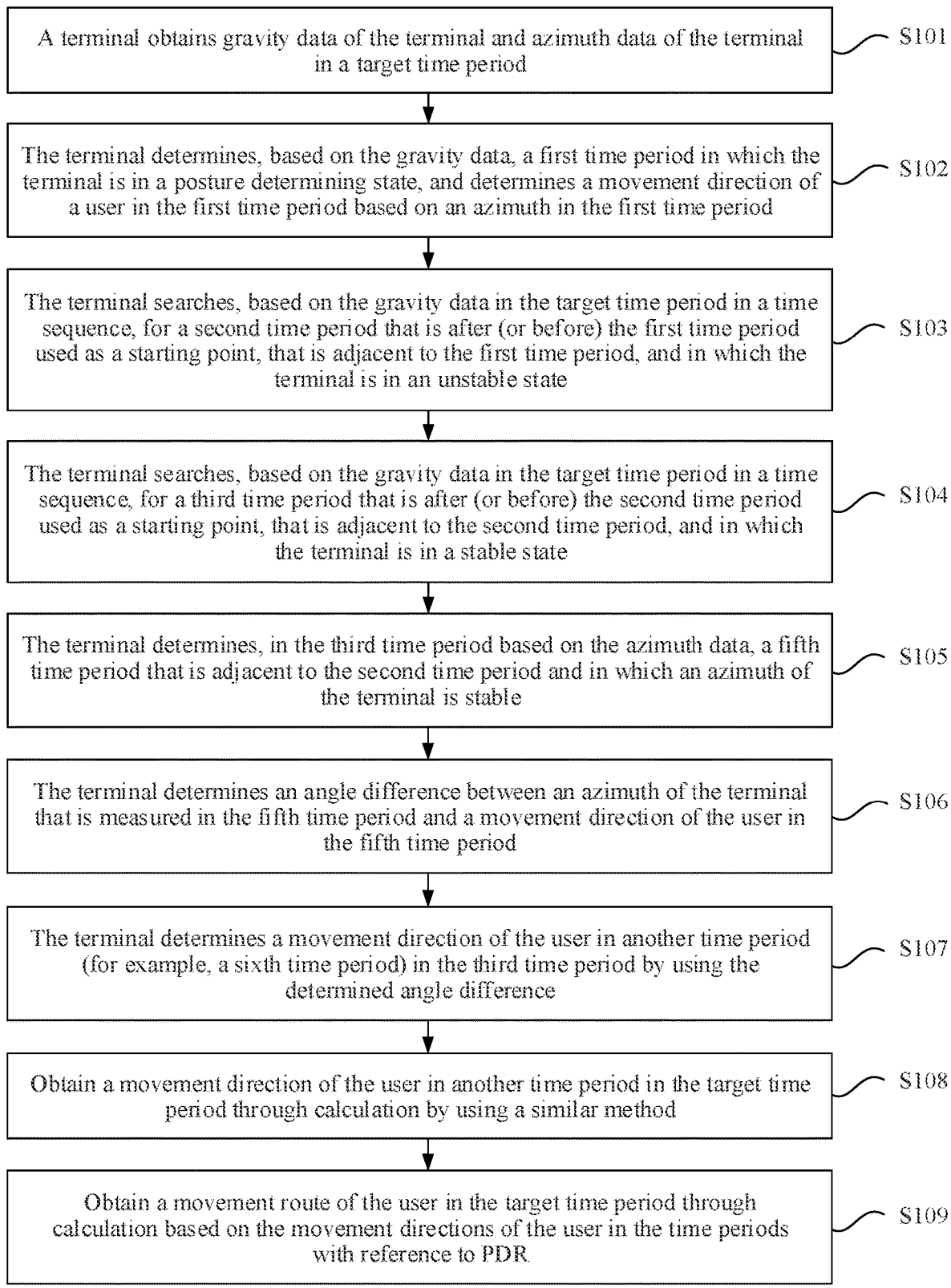
FIG. 5 is a schematic flowchart of a method for obtaining a movement track of a user according to an embodiment of this application.

FIG. 5 is a schematic flowchart of a method for obtaining a movement track of a user according to an embodiment of this application. The method specifically includes the following steps.

S101: A terminal obtains gravity data of the terminal and azimuth data of the terminal in a target time period.

The target time period is a time period in which the user moves carrying the terminal, and the terminal needs to obtain a movement track of the user in the time period. Optionally, the movement track of the user may be a walking route or a running route of the user.

Figure 6:
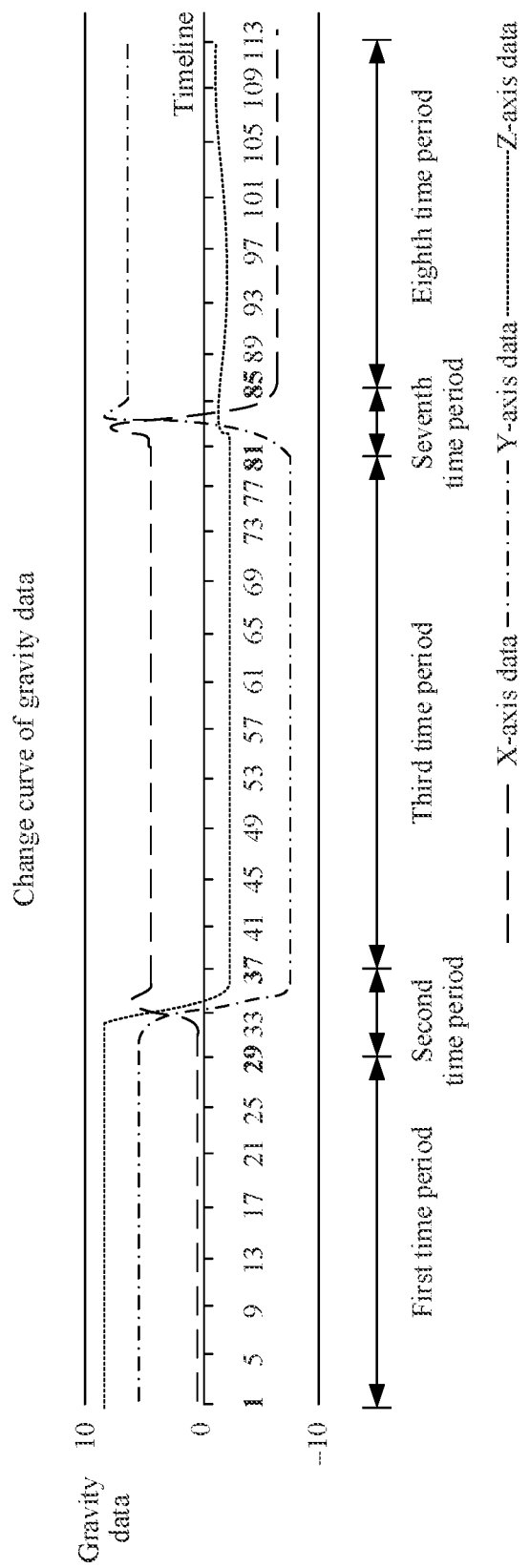
FIG. 6 is a schematic diagram of a change curve of obtained gravity data of a terminal according to an embodiment of this application.

In some embodiments of this application, the terminal may obtain the gravity data of the terminal by using a gravity sensor. The gravity data may specifically include components of gravity detected by the gravity sensor on three axes of the terminal. For example, FIG. 6 shows a change curve of the gravity data obtained by the terminal in the target time period. The lateral axis represents a time, and the longitudinal axis represents the gravity data. Three broken lines in the figure show gravity data of the terminal on three axes.

Figure 7:
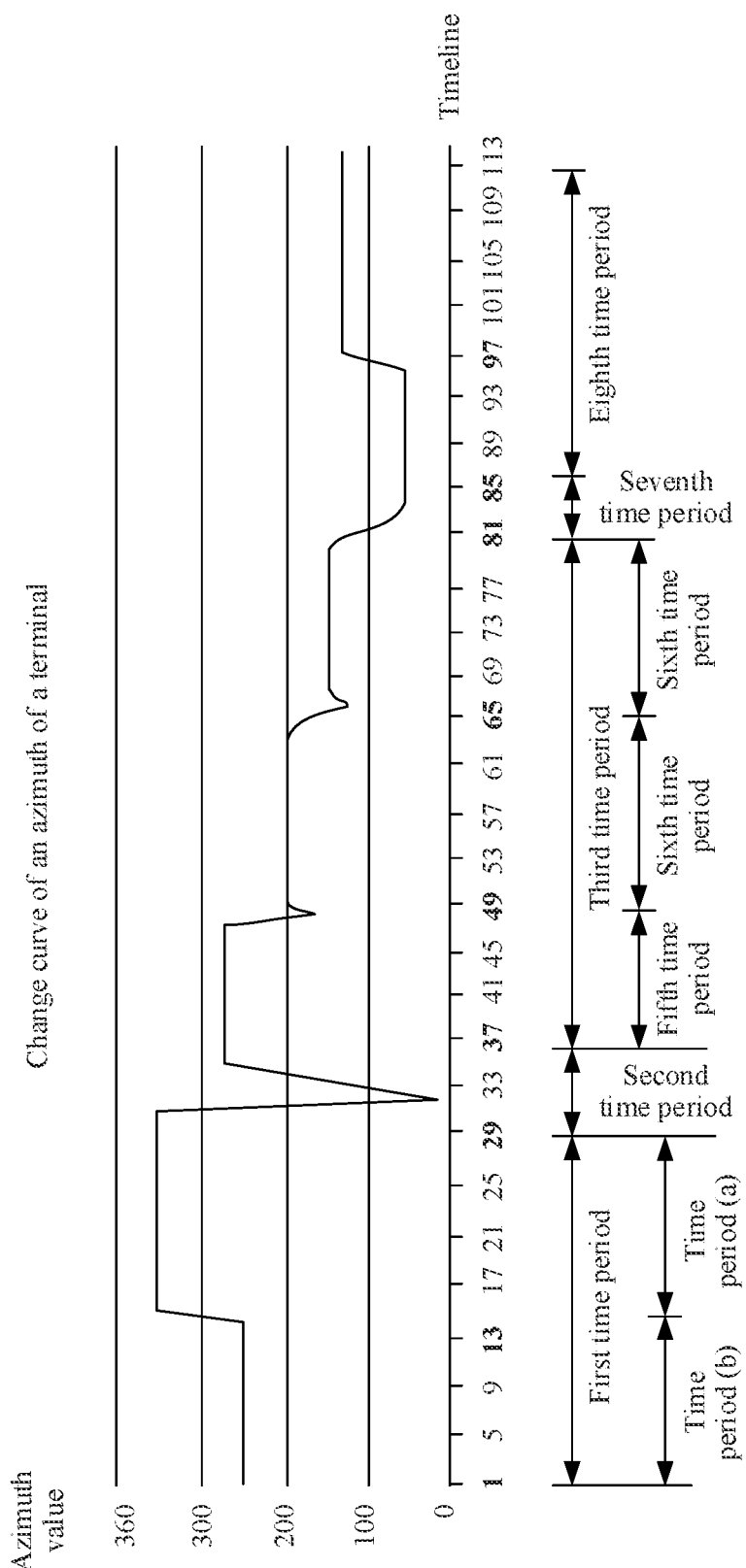
FIG. 7 is a schematic diagram of a change curve of an obtained azimuth of a terminal according to an embodiment of this application.

The terminal may obtain the azimuth of the terminal by using a direction sensor, or obtain the azimuth of the terminal by using a rotation vector sensor, or obtain the azimuth of the terminal by using a geomagnetic sensor and an acceleration sensor. For example, FIG. 7 shows a change curve of the azimuth obtained by the terminal in the target time period. The lateral axis represents a time, and the longitudinal axis represents a value of the azimuth.

It should be noted that a sensor used by the terminal to obtain the gravity data and the azimuth data is not limited in this embodiment of this application.

It should be further noted that in this embodiment of this application, the terminal may first obtain all gravity data and azimuth data in the target time period, and then perform step S102 and steps after step 102. Alternatively, after obtaining some gravity data and azimuth data in the target time period, the terminal may perform step S102 and/or some steps after step S102, continue to obtain the other gravity data and azimuth data in the target time period, and then perform other steps that are not performed. Alternatively, the terminal may perform processing based on obtained gravity data and azimuth data while obtaining the gravity data and the azimuth data of the terminal. In other words, a specific occasion on which the terminal obtains the gravity data and the azimuth data is not limited in this embodiment of this application.

S102: The terminal determines, based on the gravity data, a first time period in which the terminal is in a posture determining state, and determines a movement direction of the user in the first time period based on an azimuth in the first time period.

The posture determining state means that the terminal can determine a specific placement posture of the terminal in a time period, and can further determine a relationship between an azimuth of the terminal and a movement direction of the user in the time period.

The following lists, by using an example in this embodiment of this application, several methods for determining a posture of the terminal. It can be determined that the postures of the terminal include a first posture, a second posture, a third posture, a fourth posture, and a fifth posture. The five postures are described in detail below.

It should be noted that relative to physical space, a gravity direction of the terminal is fixed, but directions of the terminal on three axes change with a specific posture of the terminal. Therefore, components of gravity on the three axes of the terminal also change with the specific posture of the terminal, so that the posture of the terminal can be determined based on a change status of the components of the gravity on the three axes of the terminal.

Figure 8:
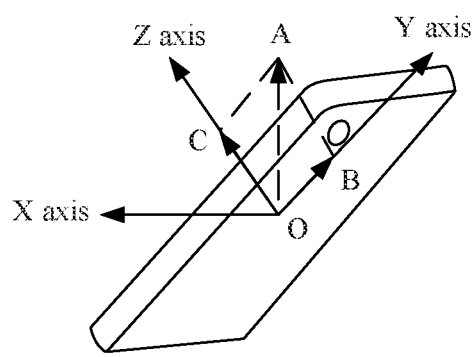
FIG. 8(1), FIG. 8(2), and FIG. 8(3) are a schematic diagram of three terminal postures according to an embodiment of this application.
Figure 8:
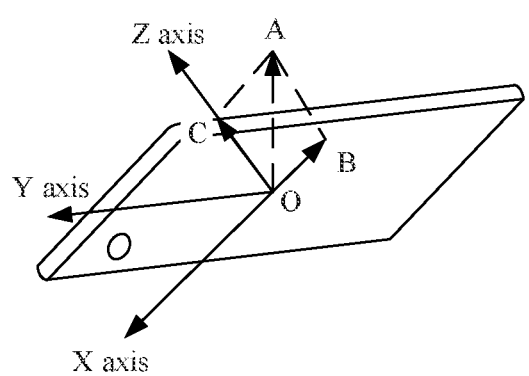
Figure 8:
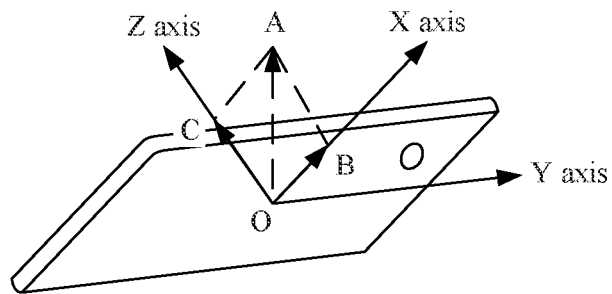

In some embodiments of this application, the terminal may determine a first posture of the terminal based on the gravity data. It can be learned with reference to a scenario in which the user uses the terminal that when walking, the user usually vertically holds the terminal and performs an operation on the terminal. For example, the terminal is in a posture shown in FIG. 8(1), namely, the first posture. In this case, a screen of the terminal is inclined relative to a horizontal plane, the screen of the terminal faces the user, and the terminal is displayed in portrait mode. It is clear that in this case, the head of the terminal is upward and points to the front of the user, and the bottom of the terminal is downward and points to the back of the user. Therefore, when the terminal is in the first posture, an azimuth of the terminal is the same as a walking direction of the user, and the azimuth of the terminal may be used to represent a movement direction of the user. It is not specified that the vertical holding is that the terminal is in a complete vertical state. As shown in FIG. 8(1), the screen of the terminal may be inclined relative to the horizontal plane.

A process of determining that the terminal is in the first posture is described by using an example in which the gravity data is obtained by the gravity sensor.

It should be first noted that actual gravity of the terminal is perpendicular to the horizontal plane and is vertically downward, and a direction of gravity detected by the gravity sensor is opposite to a direction of the actual gravity of the terminal. That is, the gravity detected by the gravity sensor is perpendicular to the horizontal plane and is vertically upward.

As shown in FIG. 8(1), it can be learned with reference to a use habit of the user that when the terminal 100 is in the first posture, the user may perform an operation on the terminal, for example, view display content of the terminal. In this case, the head of the terminal is upward, and the bottom of the terminal is downward. Therefore, components of the gravity measured by the gravity sensor on the Y axis and the Z axis are greater than 0 (for example, a vector OB and a vector OC are components of a vector OA on the Y axis and the Z axis, and the vector OA is the gravity measured by the sensor), but there is no component or a very small component on the X axis (when the user holds the terminal, the X axis of the terminal may not be completely parallel to the horizontal plane, and therefore there may be a relatively small component on the X axis). In addition, the user views the display content of the terminal, and therefore the terminal is kept in a relatively stable state. Therefore, data of the terminal on the three axes is relatively stable. Certainly, because the user is in a walking state, and the handheld terminal jitters slightly, gravity data of the terminal on the three axes fluctuates slightly, but does not change greatly.

In conclusion, if the data (components of the gravity on the three axes) on the three axes that is measured by the gravity sensor has the following features in a time period (the first time period), it may be determined that the terminal is in the first posture in the time period: Y-axis gravity data and Z-axis gravity data are greater than 0 (not close to 0) and are stable (change amplitudes of the Y-axis gravity data and the Z-axis gravity data are less than a third threshold), and X-axis data is 0 or very small (an absolute value of the X-axis gravity data is less than a fourth threshold, that is, the X-axis data is close to 0).

For example, as shown in FIG. 6, it may be deduced based on a change curve of gravity data of the terminal in a target time period (a segment from 1 to 113) that in a segment from 1 to 29, data of the terminal on three axes meets the foregoing conditions (Y-axis gravity data and Z-axis gravity data are greater than 0 and are stable, and X-axis data is very small). Therefore, it may be determined that the segment from 1 to 29 is the first time period, and the terminal is in the first posture in the first time period.

It should be noted that in the first time period, the terminal is in a posture (for example, the first posture) that can be determined. Although the posture of the terminal does not change, the walking direction of the user may change, and the azimuth that is of the terminal and that is detected by the terminal also changes. Therefore, in the first time period, a movement direction in a corresponding time period needs to be determined based on a specific azimuth in each time period in the first time period.

In some other embodiments of this application, the user walks carrying the terminal. In this process, even if neither the posture of the terminal nor the movement direction of the user changes, the terminal may shake when the user walks, and consequently the azimuth detected by the terminal fluctuates. Therefore, to reduce an error, a time period in which the azimuth is stable in the first time period may be selected, and an average value of azimuths at all time points in the time period is used as the azimuth in the time period. That the azimuth is stable means that a change of azimuth data of the terminal does not exceed a second threshold in a time period.

For example, as shown in FIG. 7, it can be learned based on a change curve of an azimuth of the terminal in a target time period (a segment from 1 to 113) that the first time period includes two time periods in which azimuths are different, namely, a time period (a) and a time period (b). An azimuth detected by the terminal in the time period (b) (a segment from 1 to 13) is 280 degrees. An azimuth detected by the terminal in the time period (a) (a segment from 13 to 29) is 350 degrees. When the terminal is in the first posture, the azimuth is the same as the movement direction of the user. Therefore, it may be determined that a movement direction of the user in the time period (b) (the segment from 1 to 13) is 280 degrees, namely, a direction of 10 degrees north of due west, for example, a direction to which an arrow 3 in FIG. 11(1) points. A movement direction of the user in the time period (a) (the segment from 13 to 29) is 350 degrees, namely, a direction of 10 degrees west of due north, for example, a direction to which an arrow 1 in FIG. 11(1) points.

In some other embodiments of this application, the terminal may determine the fourth posture and the fifth posture of the terminal based on the gravity data. It can be learned with reference to a scenario in which the user uses the terminal that when walking, the user alternatively holds the terminal horizontally, for example, watches a video after playing a game. For example, the terminal is in a posture shown in FIG. 8(2) or FIG. 8(3). In this case, the screen of the terminal is inclined relative to the horizontal plane, the screen of the terminal faces the user, and the terminal is displayed in landscape mode Specifically, if the head of the terminal is on a right side of the user, and the bottom of the terminal is on a left side of the user, a posture of the terminal shown in FIG. 8(2) is the fourth posture. It is clear that in this case, a difference between an azimuth of the terminal and a movement direction of the user is 90 degrees counterclockwise, that is, the movement direction of the user is obtained by subtracting 90 degrees from the azimuth of the terminal. If the head of the terminal is on a left side of the user, and the bottom of the terminal is on a right side of the user, a posture of the terminal shown in FIG. 8(3) is the fifth posture. It is clear that in this case, a difference between an azimuth of the terminal and a movement direction of the user is 90 degrees clockwise, that is, the movement direction of the user is obtained by adding 90 degrees to the azimuth of the terminal.

It is clear that as shown in FIG. 8(2), when the terminal is in the fourth posture, gravity data on three axes has the following features: X-axis gravity data is less than 0, Z-axis gravity data is greater than 0, Y-axis gravity data is 0 or has a very small value (an absolute value of the Y-axis gravity data is less than a fourth threshold, that is, close to 0), and the data on the three axes is relatively stable (each of change amplitudes of the gravity data on the three axes is less than a third threshold). Therefore, if the data of the terminal on the three axes in a time period meets these features, the terminal may determine that the terminal is in the fourth posture. For a specific analysis process, refer to related descriptions that the terminal determines the first posture. Details are not described herein again.

As shown in FIG. 8(3), when the terminal is in the fifth posture, gravity data on three axes has the following features: Both X-axis gravity data and Z-axis gravity data are greater than 0, Y-axis gravity data is 0 or has a very small value (an absolute value of the Y-axis gravity data is less than a fourth threshold, that is, close to 0), and the data on the three axes is relatively stable (each of change amplitudes of the gravity data on the three axes is less than a third threshold). Therefore, if the data of the terminal on the three axes in a time period meets these features, the terminal may determine that the terminal is in the fifth posture. For a specific analysis process, refer to related descriptions that the terminal determines the first posture. Details are not described herein again.

It should be noted that in addition to the gravity data, the terminal may further determine another posture of the terminal with reference to data of another sensor.

In some other embodiments of this application, the terminal may determine the second posture of the terminal based on the gravity data, data of a distance sensor, and a call status of the terminal. The second posture is a posture existing when the user holds the terminal close to an ear during a call, for example, a posture of the terminal shown in FIG. 9. It can be learned based on a use habit of the user that in this case, the head of the terminal is upward and points to the back of the user, and the bottom of the terminal is downward and points to the front of the user. Therefore, when the terminal is in the second posture, an azimuth of the terminal is opposite to a movement direction of the user. In this case, data obtained by negating the azimuth of the terminal (for example, obtained by adding 180 degrees to or subtracting 180 degrees from the azimuth data) may be used as the movement direction of the user.

An example in which the gravity data is obtained by the gravity sensor is still used for description.

Figure 9:
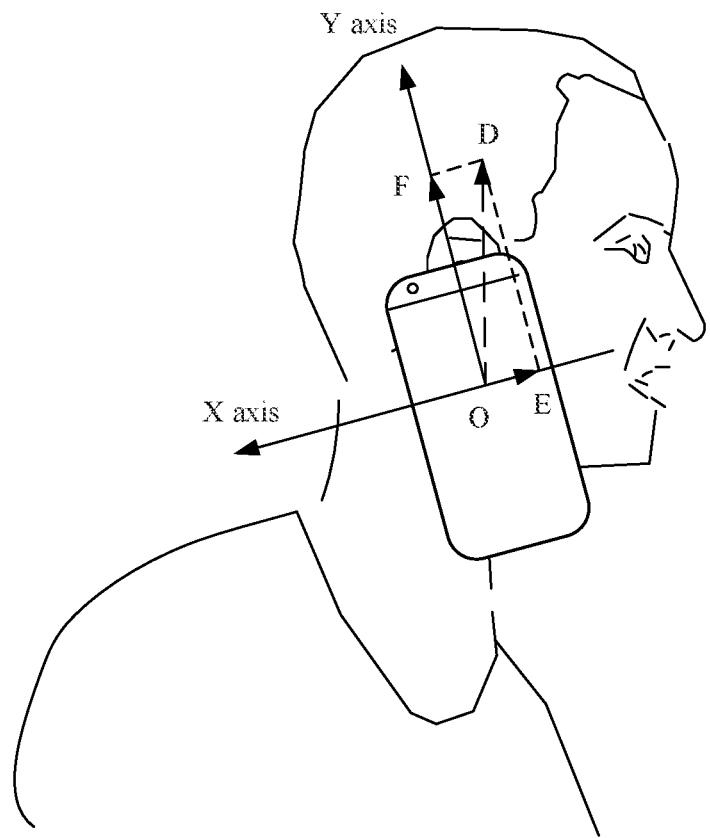
FIG. 9 is a schematic diagram of another terminal posture according to an embodiment of this application.

As shown in FIG. 9, it can be learned with reference to a use habit of the user that when the terminal is in the second posture, gravity measured by the gravity sensor has components on the Y axis and the X axis, but has no component or a very small component on the Z axis. In this case, the head of the terminal is upward, and the bottom of the terminal is downward. Therefore, a component of the gravity measured by the gravity sensor on the Y axis is greater than 0, and a component of the gravity measured by the gravity sensor on the X axis is less than 0.

To avoid a case in which these conditions may also happen to be met when the terminal is in another posture (for example, placed in a bag), in addition to determining whether the gravity data meets the foregoing features, the terminal further needs to perform determining with reference to the distance sensor and based on whether the terminal is in a call state. Specifically, when the user is on a call, the terminal approaches the face of the user. Therefore, the distance sensor may be used to further determine whether a distance between the terminal and another object is less than a preset distance. If the distance is not less than the preset distance, a case in which the terminal is in the second posture may be excluded. Similarly, the terminal may further determine whether the terminal is in a call state. If the terminal is not in the call state, a case in which the terminal is in the second posture may be excluded.

It should be noted that a sequence in which the terminal determines the data of the gravity sensor, the data of the distance sensor, and the call status of the terminal is not limited in this embodiment of this application.

In conclusion, if the data of the sensor in a time period (the first time period) meets all of the following conditions, it may be determined that the terminal is in the second posture in the time period: 1. The data (components of gravity on the three axes) on the three axes that is measured by the gravity sensor meets the following features: The Y-axis gravity data is greater than 0 (not close to 0), the X-axis gravity data is less than 0 (not close to 0), and the Z-axis gravity data is 0 or very small (close to 0). 2. The distance sensor learns, through measurement, that the distance between the terminal and the another object is less than the preset distance (for example, 5 cm), or an optical proximity sensor learns, through measurement, that an external object approaches. 3. The terminal is in the call state.

In still some other embodiments of this application, the terminal may determine the third posture of the terminal based on the gravity data, and a linear acceleration and a rotation vector of the terminal. The third posture is a posture existing when during a movement, the user holds the terminal and the terminal swings with an arm, for example, a posture of the terminal shown in FIG. 10A. If the head of the terminal points to the front of the user, an azimuth of the terminal is the same as a movement direction of the user, and the azimuth of the terminal may be directly used to represent the movement direction of the user. If the head of the terminal points to the back of the user, an azimuth of the terminal is opposite to a movement direction of the user. In this way, data obtained by negating the azimuth of the terminal (for example, obtained by adding 180 degrees to or subtracting 180 degrees from the azimuth data) may be used as the movement direction of the user.

Therefore, after it is determined that the terminal is in the third posture, a direction to which the head of the terminal points further needs to be determined. An embodiment of this application provides a method for determining a third posture of a terminal and a direction to which the head of the terminal points. The method specifically includes the following steps.

1. Determine, based on gravity data of the terminal, that the terminal is in the third posture.

Figure 10A:
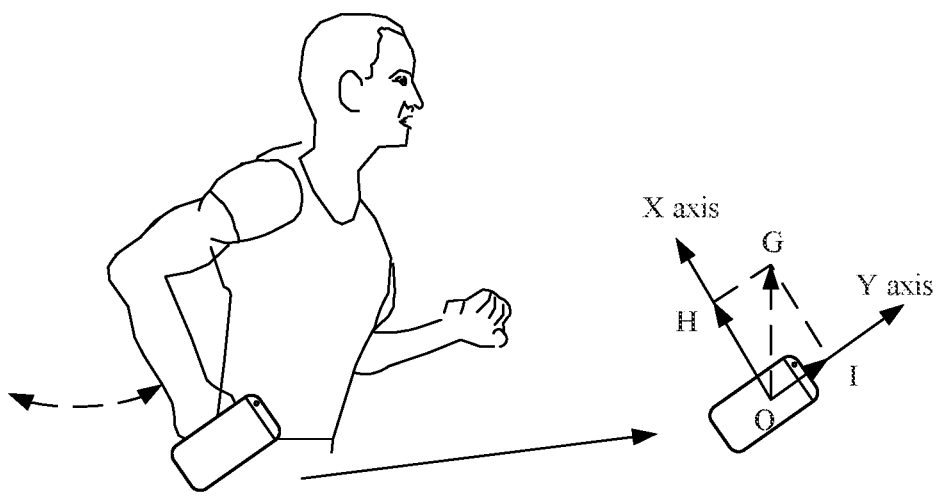
FIG. 10A is a schematic diagram of another terminal posture according to an embodiment of this application.

As shown in FIG. 10A, it can be learned with reference to a use habit of a user that when the terminal is in the third posture, an arm of the user usually swings periodically, and gravity measured by a sensor has components on the X axis and the Y axis, and values change periodically, but there is no component or a very small component on the Z axis. Therefore, if the gravity data of the terminal on the three axes meets these features, the terminal may determine that the terminal is in the third posture.

2. Based on a fact that rotation vector data of the terminal changes periodically, select rotation vector data in any segment from a wave crest to a wave trough (or from a wave trough to a wave crest) in any period.

Figure 10B:
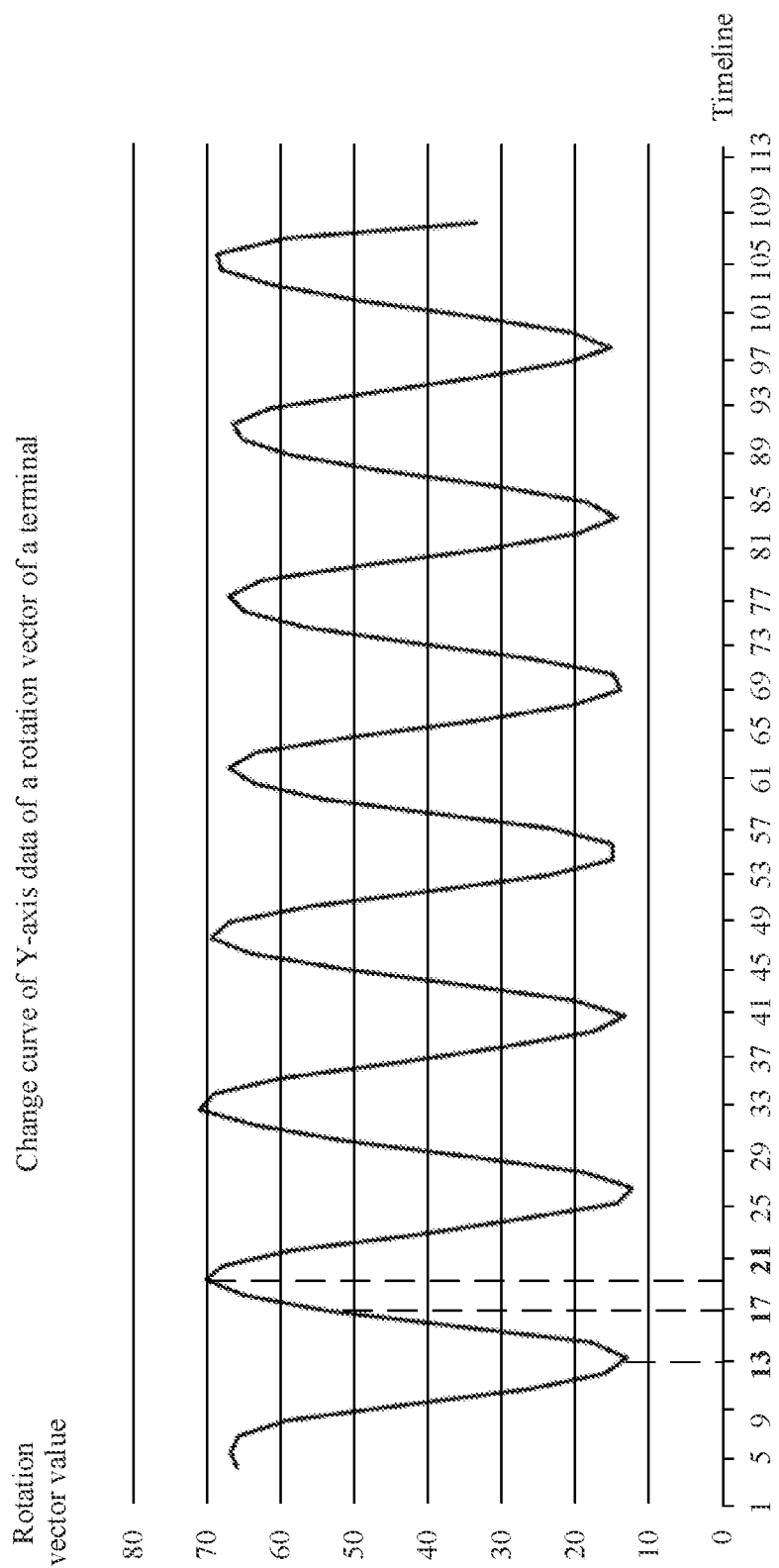
FIG. 10B is a schematic diagram of a change curve of obtained Y-axis data of a rotation vector of a terminal according to an embodiment of this application.

When the terminal swings with the arm of the user, an angle at which the arm rotates also changes periodically. Therefore, the data measured by a rotation vector sensor in the terminal also changes periodically. FIG. 10B shows a change curve of Y-axis data measured by the rotation vector sensor in the terminal.

Figure 10C:
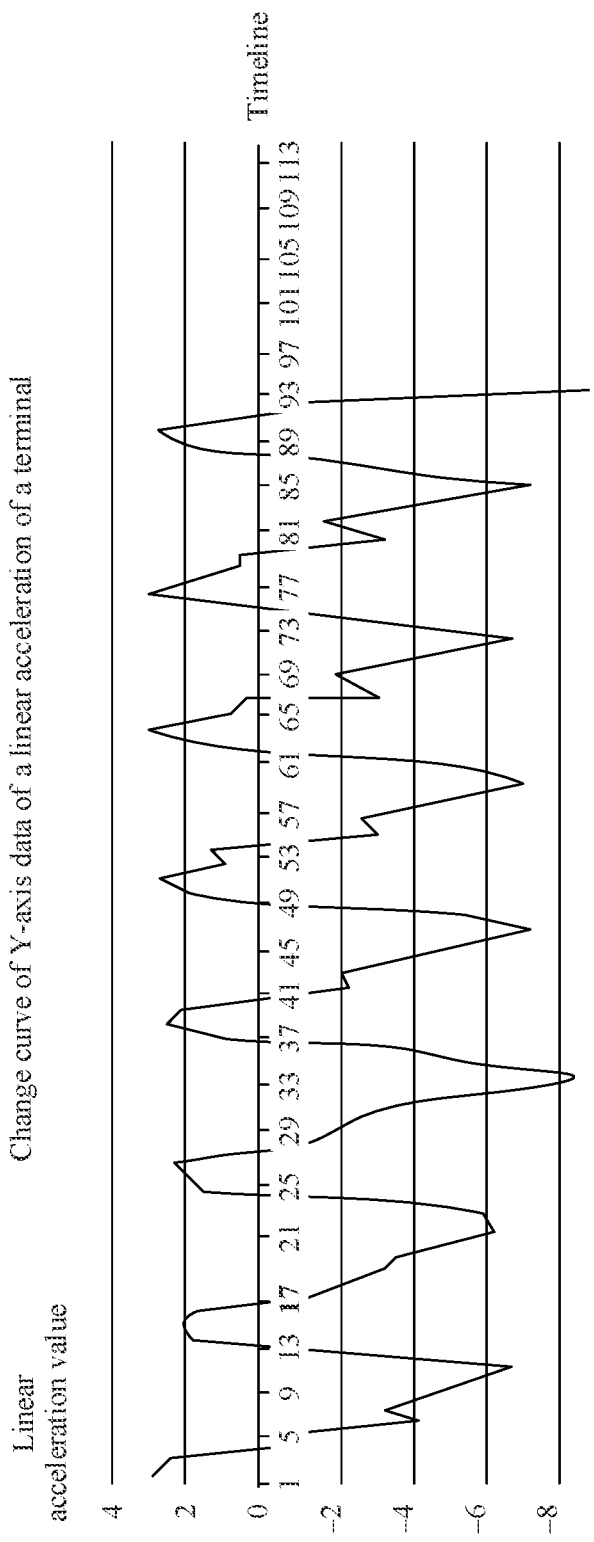
FIG. 10C is a schematic diagram of a change curve of obtained Y-axis data of a linear acceleration of a terminal according to an embodiment of this application.

It should be noted that another example of data in FIG. 10B and FIG. 10C is used to describe a process of determining that the terminal is in the third posture, and is irrelevant to the examples shown in FIG. 6 and FIG. 7.

It can be learned with reference to a swing process of the arm and a change rule of the rotation vector that when the head of the terminal points to the front of the user, in a process in which the arm swings forward to a highest point and then swings backward to a highest point (that is, swings from front to back), a rotation angle converted from the rotation vector on the Y axis gradually increases. Therefore, in this process, the Y-axis data of the rotation vector sensor changes from a wave trough to a wave crest. In a process in which the arm swings backward to a highest point and then swings forward to a highest point (that is, swings from back to front), a rotation angle converted from the rotation vector on the Y axis gradually decreases. Therefore, in this process, the Y-axis data of the rotation vector sensor changes from a wave crest to a wave trough. Similarly, when the head of the terminal points to the back of the user, in a process in which the arm swings from front to back, a rotation angle converted from the rotation vector on the Y axis gradually decreases. Therefore, in this process, the Y-axis data of the rotation vector sensor changes from a wave crest to a wave trough. In a process in which the arm swings from back to front, a rotation angle converted from the rotation vector on the Y axis gradually increases. Therefore, in this process, the Y-axis data of the rotation vector sensor changes from a wave trough to a wave crest.

It can be learned from the foregoing descriptions that a process from a wave crest to a wave trough (or from a wave trough to a wave crest) in a period may be selected. It can be determined whether the head of the terminal points to the front or the back of the user, provided that it is determined whether the arm of the user swings from front to back or swings from back to front in this process.

For example, it may be deduced according to the foregoing rule that the process from the wave trough to the wave crest may be selected, or the process from the wave crest to the wave trough may be selected. When the process from the wave trough to the wave crest is selected, if it is determined that the arm swings from front to back, it may be determined that the head of the terminal points to the front of the user; or if it is determined that the arm swings from back to front, it may be determined that the head of the terminal points to the back of the user. When the process from the wave crest to the wave trough is selected, if it is determined that the arm swings from front to back, it may be determined that the head of the terminal points to the back of the user; or if it is determined that the arm swings from back to front, it may be determined that the head of the terminal points to the front of the user.

It may be determined, by using step 3 and step 4 below, whether the arm swings from front to back or swings from back to front.

3. Determine, based on a linear acceleration of the terminal, a time point at which the arm is perpendicular to a ground plane.

It can be learned from a swing process of the arm and a change feature of the linear acceleration of the terminal on the Y axis that when the arm swings forward and backward, Y-axis data of the linear acceleration changes between positive and negative, but when the arm is perpendicular to the ground plane, the linear acceleration of the terminal is 0. Therefore, the time point at which the arm is perpendicular to the ground plane may be determined by using a change curve of the Y-axis data of a linear acceleration sensor.

4. Determine a swing direction of the arm based on the time point at which the arm is perpendicular to the ground plane and the selected process from the wave crest to the wave trough (or from the wave trough to the wave crest), and further determine a head direction of the terminal with reference to the swing direction of the arm and the rotation vector data selected in step 2.

It can be learned based on a human body structure feature that an angle at which the arm swings forward is greater than an angle at which the arm swings backward. Therefore, the swing direction of the arm may be determined based on the selected Y-axis data of the rotation vector from the wave crest to the wave trough or from the wave trough to the wave crest. Details are as follows:

The time point at which the arm is perpendicular to the ground plane is used as a segmentation point to divide the selected rotation vector data from the wave crest to the wave trough (or from the wave trough to the wave peak) into rotation vector data in two time periods, and compare change amounts of rotation vector angles in the two time periods. A larger change amount may indicate that the arm is in front of a body in the time period. A smaller change amount may indicate that the arm is behind the body in the time period. Therefore, the swing direction in the selected process from the wave crest to the wave trough (or from the wave trough to the wave crest) may be determined, and the head direction of the terminal may be further determined.

For example, the process from the wave trough to the wave crest is selected. In this process, the Y-axis data of the rotation vector gradually increases. The Y-axis data in this process is divided into data in a time period 1 and a time period 2 based on the time point at which the arm is perpendicular to the ground plane, where the time period 1 is before the time period 2. If a change amount of a rotation vector angle in the time period 1 is greater than a change amount of a rotation vector angle in the time period 2, it may be determined that the arm swings from front to back, and it may be further determined, based on the analysis in step 2, that the head of the terminal points to the front of the user. If a change amount of a rotation vector angle in the time period 1 is less than a change amount of a rotation vector angle in the time period 2, it may be determined that the arm swings from back to front, and it may be further determined, based on the analysis in step 2, that the head of the terminal points to the back of the user. Similarly, determining may alternatively be performed by selecting the process from the wave crest to the wave trough. If it is determined that the arm swings from front to back, it may be determined that the head of the terminal points to the back of the user; or if it is determined that the arm swings from back to front, it may be determined that the head of the terminal points to the front of the user.

For example, first referring to FIG. 10B, rotation vector data of the terminal in a segment from a wave trough to a wave crest in a time period, namely, a segment from 13 to 20 is selected. Then, referring to FIG. 10C, linear acceleration data in a time period, namely, a segment from 13 to 20 is viewed. A time point at which a linear acceleration of the terminal is 0 is searched for, and a time point 17 may be determined as the time point at which the arm is perpendicular to the ground plane. Back to FIG. 10B, the time point 17 is used as a separation point to compare change amounts of Y-axis data of rotation vectors in the segment from 13 to 17 and the segment from 17 to 20. It may be deduced that a change amount of Y-axis data of a rotation vector in the segment from 13 to 17 is larger, and in this case, the arm of the user is in front of the body in this time period; and a change amount of Y-axis data of a rotation vector in the segment from 17 to 20 is smaller, and in this case, the arm of the user is behind the user in this time period. Therefore, it may be determined that in the segment from 13 to 20, the arm of the user swings from front to back. It can be learned with reference to the foregoing obtained rule that the head of the terminal points to the front.

S103: The terminal searches, based on the gravity data in the target time period in a time sequence, for a second time period that is after (or before) the first time period used as a starting point, that is adjacent to the first time period, and in which the terminal is in an unstable state.

In the time sequence, the second time period may be before the first time period, or may be after the first time period.

A stable state is a state in which the posture of the terminal keeps unchanged. For example, the terminal is always in a posture in the first time period, for example, always in the first posture, always in the second posture, or always in the third posture. It can be learned based on the foregoing descriptions of the methods for determining the three postures that when the terminal is in a stable state, the gravity data of the terminal on the three axes is stable (for example, when the terminal is in the first posture or the second posture); or the gravity data on the three axes changes periodically (for example, when the terminal is in the third posture). It should be noted that the terminal may alternatively be placed in a pocket, a bag, or the like of the user. In this case, the posture of the terminal does not change, and is also in a stable state. However, a specific placement posture of the terminal in the pocket or the bag of the user cannot be determined.

The unstable state is a state in which the posture of the terminal changes. For example, the user holds the terminal close to an ear to answer a call (the terminal is in the second posture). After answering the call, the user puts the terminal back into a trouser pocket. The terminal is in an unstable state in a process in which the user moves the terminal away from the ear and then puts the terminal back into the trouser pocket. In this case, the gravity data of the terminal on the three axes changes greatly aperiodically.

Therefore, it may be determined, based on the change features of the gravity data of the terminal on the three axes, that the terminal is in the unstable state, to determine the second time period. Specifically, when the gravity data of the terminal on the three axes changes aperiodically, and a change amplitude of gravity data on any axis in a same time period exceeds a first threshold, it may be determined that the terminal is in an unstable state in the time period, where the time period is the second time period.

It should be noted that a time period (the second time period) in which the user changes the posture of the terminal is usually relatively short. In this case, the user has no time to change a movement direction. If the azimuth data of the terminal in the first time period is always relatively stable, that is, there is only one time period in which the azimuth data is stable in the first time period, it may be considered that a movement direction of the terminal in the second time period is the same as a movement direction of the terminal in the first time period. If the terminal has a plurality of time periods in which azimuth data is stable in the first time period, it may be considered that a movement direction of the terminal in the second time period is the same as a movement direction of the terminal in a time period in which the azimuth data is stable that is in the first time period and that is adjacent to the second time period. For example, in the change curve of the azimuth data shown in FIG. 7, there are two time periods in which azimuth data is stable in the first time period, namely, a time period (a) and a time period (b). Because the time period (a) is adjacent to the second time period, it may be determined that the movement direction of the user in the second time period is the same as a movement direction of the user in the time period (a) The time period (a) may be a fourth time period.

For example, as shown in FIG. 6, it may be deduced from the change curve of the gravity data in the target time period (the segment from 1 to 113) that it is found that in a segment from 29 to 37 after a first time period (a segment from 1 to 29) used as a starting point, data of the terminal on the three axes meets the foregoing conditions (the change amplitude of the gravity data exceeds the first threshold), that is, the terminal is in an unstable state. Therefore, it may be determined that the segment from 29 to 37 is the second time period. It can be learned based on the foregoing analysis that the movement direction of the user in the second time period is usually the same as the movement direction of the user in the fourth time period in the first time period. If the movement direction in the fourth time period is 350 degrees, the movement direction of the user in the second time period is also 350 degrees, for example, a direction to which an arrow 1 in FIG. 11(1) points.

S104: The terminal searches, based on the gravity data in the target time period in a time sequence, for a third time period that is after (or before) the second time period used as a starting point, that is adjacent to the second time period, and in which the terminal is in a stable state.

For example, the terminal may determine, by using the gravity data on the three axes, that the terminal is in a stable state. Specifically, if the gravity data of the terminal on the three axes is stable in a time period, or changes periodically in a time period, the terminal may be in a stable state in the time period, where the time period is the third time period.

For example, as shown in FIG. 6, it can be learned from the change curve of the gravity data in the target time period (the segment from 1 to 113) that in a segment from 37 to 81 after the second time period (the segment from 29 to 37) used as a starting point, data of the terminal on the three axes meets the foregoing conditions, that is, the terminal is in a stable state. Therefore, it may be determined that the segment from 37 to 81 is the third time period.

It should be noted that in the third time period, the terminal is in the stable state, and the posture of the terminal does not change. However, in this case, a specific posture of the terminal cannot be determined based on only a change curve of gravity data in the third time period, and therefore a relationship between a current azimuth of the terminal and a movement direction of the user cannot be directly determined, that is, the movement direction of the user cannot be directly determined based on the azimuth detected by the terminal. However, in the solution provided in this embodiment of this application, a relationship between an azimuth of the terminal and a movement direction of the user in the third time period may be deduced based on relationships between movement directions of the user and azimuths in the first time period and the second time period.

It should be noted that in the third time period, the terminal is in the stable state, the posture of the terminal does not change, but if the user changes the movement direction, the azimuth of the terminal changes with the movement direction of the user. However, in the time period, the relationship between the azimuth of the terminal and the movement direction of the user is fixed. To be specific, in the third time period, an angle difference between the azimuth of the terminal and the movement direction of the user is fixed. Therefore, the fixed angle difference may be first determined, and then an azimuth of the terminal in each time period in the third time period is corrected based on the angle difference, to determine the movement direction of the user in the third time period. That is, step S105 to step S107 are performed.

S105: The terminal determines, in the third time period based on the azimuth data, a fifth time period that is adjacent to the second time period and in which an azimuth of the terminal is stable.

That the azimuth is stable means that a change of azimuth data of the terminal does not exceed a second threshold in a time period (for example, the fifth time period). It may be understood that in a time period in which the azimuth is stable, the movement direction of the user is unchanged. It is clear that the fifth time period is included in the third time period, and is adjacent to the second time period.

It should be noted that considering that when the user moves, even if the terminal is in a fixed posture (a stable state) and the movement direction of the user does not change, the azimuth of the terminal also fluctuates slightly with shaking of a human body, to reduce an error, it is considered that the azimuth does not change if a change amplitude of the azimuth does not exceed the second threshold.

For example, as shown in FIG. 7, it may be deduced based on the change curve of the azimuth in the target time period (the segment from 1 to 113) that in a segment from 37 to 49 in the third time period (the segment from 37 to 81), an azimuth of the terminal is stable. Therefore, it may be determined that the segment from 37 to 49 is the fifth time period.

S106: The terminal determines an angle difference between the azimuth of the terminal that is measured in the fifth time period and the movement direction of the user in the fifth time period.

It can be learned from the foregoing descriptions that from the first time period to the third time period (or from the third time period to the first time period), the posture of the terminal changes from a stable state to an unstable state and then to another stable state. With reference to an actual scenario, a process in which the user changes the posture of the terminal (that is, the terminal is in an unstable state) usually takes a relatively short time, and in this time period, the user usually has no time to change the movement direction. Therefore, it is considered that movement directions of the user in extremely short time periods before and after the terminal changes the posture of the terminal are the same. In other words, the movement direction of the user in the fifth time period is the same as the movement direction of the user in the fourth time period. Because the movement direction of the user in the fourth time period is determined, the movement direction of the user in the fifth time period is also determined. Therefore, the angle difference between the azimuth of the terminal in the fifth time period and the movement direction of the user may be obtained through calculation.

It should be noted that in some embodiments of this application, in a time period in which an azimuth is stable, an average value of azimuth data at all time points in the time period may be used as the azimuth data in the time period. For example, an average value of azimuths at all time points in the fourth time period is used as the azimuth in the fourth time period. An average value of azimuths in all time periods in the fifth time period is used as the azimuth in the fifth time period.

For example, as shown in FIG. 7, it can be learned based on the change curve of the azimuth in the target time period (the segment from 1 to 113) that the azimuth in the fifth time period (the segment from 37 to 49) is 280 degrees, and the movement direction of the user in the fifth time period is the same as the movement direction of the user in the fourth time period, namely, 350 degrees. Therefore, a difference between the azimuth of the terminal in the fifth time period and the movement direction of the user is 70 degrees (350 degrees minus 280 degrees).

S107: The terminal determines a movement direction of the user in another time period (for example, a sixth time period) in the third time period by using the determined angle difference.

The sixth time period is included in the third time period, and is a time period that is not adjacent to the second time period and in which an azimuth is stable. It should be noted that in the third time period, the user may not change the movement direction all the time. In this case, there is only one time period in which the azimuth is stable in the third time period, and the third time period is the same as the fifth time period. If the user changes the movement direction in the third time period, the third time period includes the fifth time period and at least one sixth time period.

The fifth time period is a time period in the third time period, and an angle difference between the azimuth of the terminal and the movement direction of the user in the third time period is fixed. Therefore, the angle difference may be used to determine the movement direction of the user in the another time period in the third time period.

It should be noted that in step S106, the angle difference obtained through calculation by subtracting the azimuth in the fifth time period from the movement direction in the fifth time period may be used. Therefore, in this step, the azimuth in the another time period in the third time period plus the angle difference is determined as the movement direction of the user in the another time period in the third time period. In step S106, the angle difference obtained through calculation by subtracting the movement direction in the fifth time period from the azimuth in the fifth time period may alternatively be used. Therefore, in this step, the azimuth in the another time period in the third time period minus the angle difference is determined as the movement direction of the user in the another time period in the third time period. This is not limited in this embodiment of this application.

For example, as shown in FIG. 7, it is deduced from the foregoing descriptions that in the third time period, the angle difference between the azimuth of the terminal and the movement direction of the user is 70 degrees. As shown in FIG. 7, an azimuth of the terminal in a segment from 49 to 65 in the third time period is 200 degrees. In this case, a movement direction of the user in the segment from 49 to 65 is the azimuth of the terminal plus the angle difference, namely, 270 degrees (200 degrees plus 70 degrees, that is, a due west direction). An azimuth of the terminal in a segment from 65 to 81 in the third time period is 150 degrees. In this case, a movement direction of the user in the segment from 65 to 81 is 220 degrees (150 degrees plus 70 degrees), that is, a southwest direction, for example, a direction to which an arrow 2 in FIG. 11(1) points.

S108: Obtain a movement direction of the user in another time period in the target time period through calculation by using a similar method.

In some embodiments of this application, the terminal may determine, by using the foregoing method, movement directions of the user in all unstable time periods and stable time periods that are adjacent to the first time period. For an unstable time period (for example, a segment from 81 to 85, denoted as a seventh time period) and a stable time period (a segment from 85 to 113, denoted as an eighth time period) that are not adjacent to the first time period, the seventh time period is adjacent to the third time period. Because the movement direction in the third time period is determined, a movement direction of the user in the time period may be determined based on the movement direction in the third time period by using a similar method, so that a movement direction of the user in the eighth time period is determined based on the movement directions in the seventh time period and the third time period.

As shown in FIG. 6, it may be determined, based on the gravity data of the terminal on the three axes, that the segment from 81 to 85 (the seventh time period) corresponds to an unstable state, and the segment from 85 to 113 (the eighth time period) corresponds to a stable state. The seventh time period is adjacent to the third time period, and the eighth time period is adjacent to the seventh time period. Similarly, it is considered that the user does not change the movement direction in a short time of changing the posture of the terminal. To be specific, the movement direction of the user in the seventh time period is the same as the movement direction of the user in the time period in which the azimuth is stable that is in the third time period and that is adjacent to the seventh time period. For example, the movement direction of the user in the segment from 81 to 85 is the same as the movement direction of the user in the segment from 65 to 81, and is 220 degrees. After changing the posture of the terminal, the user does not change the movement direction when the terminal is just in a stable state. For example, it can be learned based on the change curve of the azimuth of the terminal that in the segment from 85 to 113, there are two time periods in which azimuths are in a stable state, namely, a segment from 85 to 97 and a segment from 97 to 113. A movement direction of the user in the segment from 85 to 97 is the same as the movement direction of the user in the segment from 65 to 81, and is 220 degrees. A difference between the movement direction of the user and an azimuth of the terminal in the segment from 85 to 97 is 160 degrees (220 degrees minus 60 degrees). In addition, in a same time period in which an azimuth is stable, a relationship between an azimuth of the terminal and a movement direction of the user is fixed, that is, a difference between azimuths is fixed. Therefore, a difference between a walking direction of the user in the segment from 97 to 113 and an azimuth of the terminal in this case is also 160 degrees. In this way, the movement direction of the user in the segment from 97 to 113 is 280 degrees (120 degrees plus 160 degrees), namely, a direction of 10 degrees north of due west, for example, a direction to which an arrow 3 in FIG. 11(1) points.

S109: Obtain a movement route of the user in the target time period through calculation based on the movement directions of the user in all the time periods with reference to PDR.

Specifically, the PDR algorithm can be used to obtain a step size and a quantity of steps of the user through calculation, to obtain a movement distance of the user in each direction through calculation with reference to the determined movement direction of the user in each time period, so that the movement route of the user in the target time period can be obtained.

For example, it is assumed that the user moves at a constant speed in the target time period. FIG. 11(2) shows an example of obtaining a movement track of a user through calculation according to this embodiment of this application. A broken line MN in the figure shows a schematic diagram of a movement line of the user in a time segment from 1 to 113.

It can be learned that in this embodiment of this application, in a movement process of the user, a movement direction of the user is first determined for a time period in which the posture of the terminal can be determined, and then a movement direction of the user in a time period in which the terminal is in an unstable state and that is adjacent to the time period and a movement direction of the user in a stable state adjacent to the unstable state are determined based on the movement direction of the user By analogy, a movement direction of the user in each time period in the target time period is determined. In addition, the movement distance of the user in each time period is obtained through calculation with reference to the PDR algorithm, to obtain the movement track of the user in the target time period. According to the method provided in this embodiment of this application, accuracy of determining the movement direction of the user in each time period is improved, to improve accuracy of obtaining the movement track of the user in the target time period, and improve user experience.

It may be understood that to implement the foregoing functions, the terminal includes corresponding hardware and/or software modules for performing the functions. Algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments of this application, the terminal may be divided into function modules based on the foregoing method examples. For example, function modules corresponding to the functions may be obtained through division, or two or more functions may be integrated into one processing module. The integrated module may be implemented in a form of hardware. It should be noted that in the embodiments of this application, division into the modules is an example and is merely logical function division, and may be other division in an actual implementation.

Figure 12:
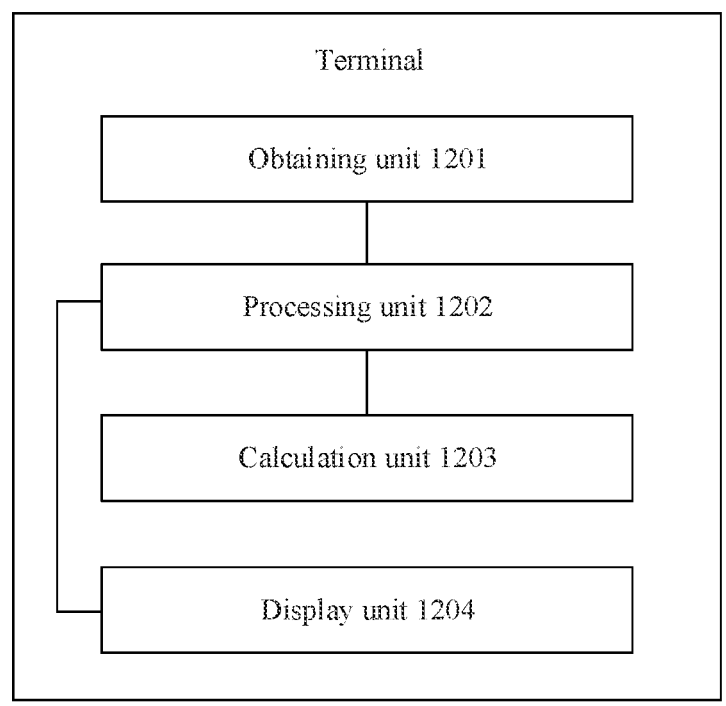
FIG. 12 is a schematic structural diagram 3 of a terminal according to an embodiment of this application.

When each function module is obtained through division based on each corresponding function, FIG. 12 is a possible schematic composition diagram of the terminal in the foregoing embodiments. As shown in FIG. 12, the terminal may include an obtaining unit 1201 and a processing unit 1202.

The obtaining unit 1201 is configured to obtain gravity data of the terminal.

The processing unit 1202 is configured to: determine, based on gravity data in the first time period, that the terminal is in a first posture in the first time period; determine a movement direction of a user in the first time period based on the first posture and azimuth data in the first time period; if a change amplitude of gravity data of the terminal in a second time period is greater than a first threshold, determine that the terminal is in an unstable state in the second time period, where the second time period is adjacent to the first time period; determine a movement direction of the user in the second time period based on the movement direction of the user in the first time period; if a change amplitude of gravity data of the terminal in a third time period is less than or equal to the first threshold, determine that the terminal is in a stable state in the third time period, where the third time period is adjacent to the second time period; determine a movement direction of the user in the third time period based on the movement direction of the user in the second time period and azimuth data in the third time period; and determine a first movement track of the user based on the movement directions of the user in the first time period, the second time period, and the third time period.

The obtaining unit 1201 may be further configured to support the terminal in performing step S101 and the like, and/or is configured to perform another process of the technology described in this specification.

An input unit 2102 may be configured to support the terminal in performing steps S102 to S108 and the like, and/or is configured to perform another process of the technology described in this specification.

The terminal may further include a calculation unit 1203 that may be configured to support the terminal in performing step S109 and the like, and/or is configured to perform another process of the technology described in this specification.

The terminal may further include a display unit 1204 that may be configured to support the terminal in displaying a roadmap that is of a user movement and that is obtained after step S109 and the like, and/or is configured to perform another process of the technology described in this specification.

It should be noted that all related content of the steps in the foregoing method embodiments may be cited in function descriptions of corresponding function modules. Details are not described herein again.

The terminal provided in this embodiment of this application is configured to perform the foregoing method for obtaining a movement track of a user, and therefore can achieve a same effect as the foregoing method for obtaining a movement track of a user.

When an integrated unit is used, the terminal may include a processing module and a storage module. The processing module may be configured to: control and manage an action of the terminal, for example, may be configured to support the terminal in performing the steps performed by the obtaining unit 1201, the processing unit 1202, and the calculation unit 1203. The storage module may be configured to support the terminal in storing program code, data, and the like. In addition, the terminal may further include a communications module that may be configured to support the terminal in communicating with another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of digital signal processing (digital signal processing, DSP) and a microprocessor. The storage module may be a memory. The communications module may be specifically a device that interacts with another terminal, such as a radio frequency circuit, a Bluetooth chip, or a Wi-Fi chip.

In an embodiment, when the processing module is a processor, and the storage module is a memory, the terminal in this embodiment of this application may be a device having the structure shown in FIG. 1.

An embodiment of this application further provides a computer storage medium. The computer storage medium stores a computer instruction, and when the computer instruction is run on a terminal, the terminal is enabled to perform the foregoing related method steps to implement the method for obtaining a movement track of a user in the foregoing embodiments.

An embodiment of this application further provides a computer program product. When the computer program product is run on a computer, the computer is enabled to perform the foregoing related steps to implement the method for obtaining a movement track of a user in the foregoing embodiments.

In addition, an embodiment of this application further provides an apparatus. The apparatus may be specifically a chip, a component, or a module. The apparatus may include a processor and a memory that are connected. The memory is configured to store a computer execution instruction, and when the apparatus runs, the processor may execute the computer execution instruction stored in the memory, so that the chip performs the method for obtaining a movement track of a user in the foregoing method embodiments.

The terminal, the computer storage medium, the computer program product, and the chip provided in the embodiments of this application each are configured to perform the corresponding method provided above. Therefore, for beneficial effects that can be achieved by the terminal, the computer storage medium, the computer program product, and the chip, refer to the beneficial effects in the corresponding method provided above. Details are not described herein again.

In the descriptions in the foregoing implementations, a person skilled in the art may clearly understand that for the purpose of convenient and brief description, division into the foregoing function modules is merely used as an example for description. In actual application, the foregoing functions can be allocated to different function modules for implementation based on a requirement. To be specific, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may be one or more physical units, and may be located in one place, or may be distributed on different places. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An apparatus, comprising:
a display;
a memory comprising instructions; and
one or more processors coupled to the display and the memory and configured to execute the instructions to:
obtain, from a satellite positioning system, a positioning signal comprising location information of the apparatus in a first time period;
display, based on the location information, a first segment of a movement track of the apparatus on the display, wherein the first segment of the movement track indicates a first movement direction of the apparatus in the first time period;
stop being able to obtain, from the satellite positioning system, the positioning signal;
obtain, based on first gravity data of the apparatus in a second time period, a first placement posture of the apparatus in the second time period;
calculate, based on the first placement posture and first azimuth data of the apparatus in the second time period, a second movement direction of the apparatus in the second time period;
display, based on the second movement direction, a second segment of the movement track of the apparatus on the display, wherein the second segment of the movement track indicates the second movement direction of the apparatus in the second time period;
obtain, based on second gravity data of the apparatus in a third time period, a second placement posture of the apparatus in the third time period, wherein the second placement posture is different than the first placement posture;
detect that the apparatus is unstable when a first difference between the first gravity data and the second gravity data along a movement axis within a fourth time period exceeds a threshold;
calculate, based on detecting that the apparatus is unstable and based on the second placement posture and second azimuth data of the apparatus in the third time period, a third movement direction of the apparatus in the third time period, wherein the third movement direction is the same as the second movement direction; and
display, based on the third movement direction, a third segment of the movement track of the apparatus on the display, wherein the third segment of the movement track indicates that the apparatus moves in a same direction in the second time period and the third time period.

2. The apparatus of claim 1, wherein the first azimuth data and the second azimuth data indicate different directions.

3. The apparatus of claim 1, further comprising a gravity sensor, and wherein the one or more processors are further configured to obtain, from the gravity sensor, the first gravity data and the second gravity data.

4. The apparatus of claim 1, further comprising a direction sensor, a rotation vector sensor, a geomagnetic sensor, or an acceleration sensor, and wherein the one or more processors are further configured to obtain, from the direction sensor, the rotation vector sensor, the geomagnetic sensor, or the acceleration sensor, the first azimuth data and second azimuth data.

5. The apparatus of claim 1, wherein the one or more processors are further configured to:
obtain, based on third gravity data of the apparatus in a fifth time period, a third placement posture of the apparatus in the fifth time period, wherein the third placement posture is the same as the second placement posture;
detect that the apparatus is stable when a second difference between the second gravity data and the third gravity data is within the threshold; and
calculate, based on detecting that the apparatus is stable and based on the third placement posture and third azimuth data of the apparatus in the fifth time period, a fourth movement direction of the apparatus in the fifth time period, wherein the fourth movement direction is different than the third movement direction.

6. The apparatus of claim 5, wherein the second azimuth data and the third azimuth data indicate different directions of the apparatus.

7. The apparatus of claim 1, wherein the movement axis comprises an x-axis, a y-axis, or a z-axis of movement of the apparatus.

8. A method, comprising:
obtaining, from a satellite positioning system, a positioning signal comprising location information of an apparatus in a first time period;
displaying, based on the location information, a first segment of a movement track of the apparatus on a display of the apparatus, wherein the first segment of the movement track indicates a first movement direction of the apparatus in the first time period;
stopping being able to obtain, from the satellite positioning system, the positioning signal;
obtaining, based on first gravity data of the apparatus in a second time period, a first placement posture of the apparatus in the second time period;
calculating, based on the first placement posture and first azimuth data of the apparatus in the second time period, a second movement direction of the apparatus in the second time period;
displaying, based on the second movement direction, a second segment of the movement track of the apparatus on the display, wherein the second segment of the movement track indicates the second movement direction of the apparatus in the second time period;
obtaining, based on second gravity data of the apparatus in a third time period, a second placement posture of the apparatus in the third time period, wherein the second placement posture is different than the first placement posture;
detecting that the apparatus is unstable when a first difference between the first gravity data and the second gravity data along a movement axis within a fourth time period exceeds a threshold;
calculating, based on detecting that the apparatus is unstable and based on the second placement posture and second azimuth data of the apparatus in the third time period, a third movement direction of the apparatus in the third time period, wherein the third movement direction is the same as the second movement direction; and
displaying, based on the third movement direction, a third segment of the movement track of the apparatus on the display, wherein the third segment of the movement track indicates that the apparatus moves in a same direction in the second time period and the third time period.

9. The method of claim 8, wherein the first azimuth data and the second azimuth data indicate different directions.

10. The method of claim 8, further comprising obtaining, from a gravity sensor of the apparatus, the first gravity data and the second gravity data.

11. The method of claim 8, further comprising obtaining, from a direction sensor, a rotation vector sensor, a geomagnetic sensor, or an acceleration sensor, the first azimuth data and the second azimuth data.

12. The method of claim 8, further comprising:
obtaining, based on third gravity data of the apparatus in a fifth time period, a third placement posture of the apparatus in the fifth time period, wherein the third placement posture is the same as the second placement posture;
detecting that the apparatus is stable when a second difference between the second gravity data and the third gravity data is within the threshold; and
calculating, based on detecting that the apparatus is stable and based on the third placement posture and third azimuth data of the apparatus in the fifth time period, a fourth movement direction of the apparatus in the fifth time period, wherein the fourth movement direction is different than the third movement direction.

13. The method of claim 12, wherein the second azimuth data and the third azimuth data indicate different directions of the apparatus.

14. The method of claim 8, wherein the movement axis comprises an x-axis, a y-axis, or a z-axis of movement of the apparatus.

15. A computer program product comprising instructions stored on a non-transitory computer-readable medium that, when executed by one or more processors, cause an apparatus to:
obtain, from a satellite positioning system, a positioning signal comprising location information of the apparatus in a first time period;
display, based on the location information, a first segment of a movement track of the apparatus on the display, wherein the first segment of the movement track indicates a first movement direction of the apparatus in the first time period;
stop being able to obtain, from the satellite positioning system, the positioning signal;
obtain, based on first gravity data of the apparatus in a second time period, a first placement posture of the apparatus in the second time period;
calculate, based on the first placement posture and first azimuth data of the apparatus in the second time period, a second movement direction of the apparatus in the second time period;
display, based on the second movement direction, a second segment of the movement track of the apparatus on the display, wherein the second segment of the movement track indicates the second movement direction of the apparatus in the second time period;
obtain, based on second gravity data of the apparatus in a third time period, a second placement posture of the apparatus in the third time period, wherein the second placement posture is different than the first placement posture;
detect that the apparatus is unstable when a first difference between the first gravity data and the second gravity data along a movement axis within a fourth time period exceeds a threshold;
calculate, based on detecting that the apparatus is unstable and based on the second placement posture and second azimuth data of the apparatus in the third time period, a third movement direction of the apparatus in the third time period, wherein the third movement direction is the same as the second movement direction; and
display, based on the third movement direction, a third segment of the movement track of the apparatus on the display, wherein the third segment of the movement track indicates that the apparatus moves in a same direction in the second time period and the third time period.

16. The computer program product of claim 15, wherein the first azimuth data and the second azimuth data indicate different directions.

17. The computer program product of claim 15, wherein the one or more processors are further configured to cause the apparatus to obtain, from a gravity sensor, the first gravity data and the second gravity data.

18. The computer program product of claim 15, wherein the one or more processors are further configured to cause the apparatus to obtain, from a direction sensor, a rotation vector sensor, a geomagnetic sensor, or an acceleration sensor, the first azimuth data and the second azimuth data.

19. The computer program product of claim 15, wherein the one or more processors are further configured to cause the apparatus to:
  obtain, based on third gravity data of the apparatus in a fifth time period, a third placement posture of the apparatus in the fifth time period, wherein the third placement posture is the same as the second placement posture;
  detect that the apparatus is stable when a second difference between the second gravity data and the third gravity data is within the threshold; and
  calculate, based on detecting that the apparatus is stable and based on the third placement posture and third azimuth data of the apparatus in the fifth time period, a fourth movement direction of the apparatus in the fifth time period, wherein the fourth movement direction is different than the third movement direction.

20. The computer program product of claim 15, wherein the movement axis comprises an x-axis, a y-axis, or a z-axis of movement of the apparatus.

\* \* \* \* \*